United States Patent
Zhu

(10) Patent No.: US 12,292,847 B2
(45) Date of Patent: May 6, 2025

(54) MULTIPROCESSOR SYSTEM AND METHOD FOR CONFIGURING MULTIPROCESSOR SYSTEM

(71) Applicant: Huawei Technologies Co., Ltd., Shenzhen (CN)

(72) Inventor: Huixiong Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 18/151,705

(22) Filed: Jan. 9, 2023

(65) Prior Publication Data

US 2023/0161726 A1 May 25, 2023

Related U.S. Application Data

(63) Continuation of application No. PCT/CN2021/102235, filed on Jun. 25, 2021.

(30) Foreign Application Priority Data

Jul. 10, 2020 (CN) .......................... 202010660272.X
Aug. 31, 2020 (CN) .......................... 202010899009.6

(51) Int. Cl.
*G06F 13/20* (2006.01)
*G06F 13/40* (2006.01)
*G06F 13/42* (2006.01)

(52) U.S. Cl.
CPC ...... *G06F 13/4022* (2013.01); *G06F 13/4221* (2013.01); *G06F 2213/0026* (2013.01)

(58) Field of Classification Search
CPC ............. G06F 13/4022; G06F 13/4221; G06F 2213/0026; G06F 2213/0058; G06F 13/12; G06F 13/1652; G06F 13/404; G06F 13/4063; G06F 15/173

See application file for complete search history.

(56) References Cited

U.S. PATENT DOCUMENTS

| | | | |
|---|---|---|---|
| 11,042,496 B1* | 6/2021 | BeSerra | G06F 13/4282 |
| 2006/0242352 A1* | 10/2006 | Torudbakken | G06F 13/4022 710/312 |
| 2012/0120959 A1* | 5/2012 | Krause | G06F 15/17381 370/392 |
| 2014/0181354 A1* | 6/2014 | Yi | G06F 13/4022 710/313 |
| 2017/0068636 A1* | 3/2017 | Vishwanathan | G06F 13/4282 |

FOREIGN PATENT DOCUMENTS

| | | |
|---|---|---|
| CN | 113986800 A | 1/2022 |
| EP | 1591910 A1 | 11/2005 |
| WO | 2016054556 A1 | 4/2016 |

* cited by examiner

*Primary Examiner* — Henry Tsai
*Assistant Examiner* — Kim T Huynh
(74) *Attorney, Agent, or Firm* — Conley Rose, P.C.

(57) ABSTRACT

A multiprocessor system includes a processor in a local domain that performs enumeration, and when a PCIe device in an external domain is not found by the processor in the local domain, an access conflict is avoided when PCIe switches in the two domains are interconnected, and the processor or a PCIe device in the local domain normally accesses the PCIe device in the external domain. Further, a communication path of the cross-domain access is established by using a bus and the PCIe switches in the two domains, and does not depend on forwarding of a processor.

20 Claims, 9 Drawing Sheets

MULTIPROCESSOR SYSTEM AND METHOD FOR CONFIGURING MULTIPROCESSOR SYSTEM

CROSS-REFERENCE TO RELATED APPLICATIONS

This application is a continuation application of International Patent Application No. PCT/CN2021/102235, filed on Jun. 25, 2021, which claims priority to Chinese Patent Application No. 202010660272.X, filed on Jul. 10, 2020 and Chinese Patent Application No. 202010899009.6, filed on Aug. 31, 2020. All of the aforementioned patent applications are hereby incorporated by reference in their entireties.

TECHNICAL FIELD

This application relates to the computer field, and in particular, to a multiprocessor system and a method for configuring a multiprocessor system.

BACKGROUND

Peripheral Component Interconnect Express (PCIe) is a high-speed serial computer expansion bus standard. PCIe has various advantages including a higher maximum system bus throughput, a smaller physical footprint, better performance scaling for bus devices, a more detailed error detection and reporting mechanism, and the like. Therefore, PCIe has become a popular system architecture in modern computers.

However, in an existing PCIe-based system architecture, for example, in a host-to-device (H2D) system architecture, PCIe switches in PCIe domains are disconnected from each other, the PCIe switches in the domains do not communicate with each other, and a communication relationship between the domains is established based on communication between processors in different domains. However, in this manner, there is a problem of an excessively long delay of cross-domain access caused by an excessively long communication path that occurs when a processor or a PCIe device in a local domain needs to access a PCIe device in another domain. However, if PCIe switches in two PCIe domains are directly connected to establish a communication relationship between the two domains, an access conflict is caused.

SUMMARY

Embodiments of this application provide a multiprocessor system and a method for configuring a multiprocessor system, to help reduce a delay of cross-domain access. The technical solutions are as follows.

According to a first aspect, a multiprocessor system is provided. The system includes at least two PCIe domains. For example, the system includes a first PCIe domain and a second PCIe domain. The first PCIe domain includes a first processor, a first PCIe switch connected to the first processor, and a first PCIe device connected to the first PCIe switch. The second PCIe domain includes a second processor, a second PCIe switch connected to the second processor, and a second PCIe device connected to the second PCIe switch. The first PCIe switch communicates with the second PCIe switch by using a bus. When the first processor performs enumeration, the second PCIe device that is in the second PCIe domain and that is connected to the second PCIe switch is not found by the first processor; and the first processor or the first PCIe device accesses the second PCIe device by using the bus.

In the multiprocessor system provided in the first aspect, the system is an improved version of an existing PCIe-based system architecture, and implements a connection between two PCIe domains when an access conflict is avoided. When a processor in a local domain performs enumeration, a PCIe device in an external domain is not found by the processor in the local domain, so that an access conflict triggered when the PCIe device in the external domain is found by the processor in the local domain is avoided. Therefore, when PCIe switches in the two domains are interconnected, a device such as the processor or a PCIe device in the local domain can still normally access the PCIe device in the external domain. This improves communication reliability of cross-domain access. In addition, a communication path of the cross-domain access is established by using a bus and the PCIe switches in the two domains, and does not depend on forwarding of a processor. This helps shorten the communication path of the cross-domain access, and reduces a delay of the cross-domain access when the access conflict is avoided.

Optionally, when the second processor performs enumeration, the first PCIe device that is in the first PCIe domain and that is connected to the first PCIe switch is not found by the second processor; and the second processor or the second PCIe device accesses the first PCIe device by using the bus.

Optionally, the first PCIe switch includes a first fabric port. The first fabric port is configured to communicate with the second PCIe switch, and the first fabric port is configured to reject a scanning instruction of the first processor when the first processor performs enumeration.

Because a fabric port rejects a scanning instruction of a central processing unit in a PCIe enumeration process, the fabric port and a device connected to the fabric port are hidden from the central processing unit, so as to provide an implementation having low implementation complexity and high practicability for a feature that "a PCIe device in an external domain is not found by a processor in a local domain".

Optionally, the second PCIe switch includes a second fabric port. The second fabric port is configured to communicate with the first PCIe switch, and the second fabric port is configured to reject a scanning instruction of the second processor when the second processor performs enumeration.

Optionally, the second PCIe switch includes a second fabric port. The second fabric port is configured to communicate with the first PCIe switch, and the second fabric port is configured to reject a scanning instruction of the first processor when the first processor performs enumeration.

Similar to a solution in which the first fabric port is configured to reject the scanning instruction of the first processor, when the second fabric port is configured to reject the scanning instruction of the first processor, an effect that a device in the second PCIe domain is not found by the first processor can also be implemented.

Optionally, the first PCIe switch includes the first fabric port. The first fabric port is configured to communicate with the second PCIe switch, and the first fabric port is configured to reject a scanning instruction of the second processor when the second processor performs enumeration.

Optionally, the first PCIe switch further includes a first host port. The first PCIe switch is connected to the first processor by using the first host port, and the first host port is not directly connected to the first fabric port.

Because a host port is not directly connected to the fabric port, a processor in the local domain is prevented from finding a PCIe device in the peer domain based on a hardware connection relationship. Therefore, this implementation helps a feature that "a PCIe device in a peer domain is not found by a processor in a local domain" be more reliable, and further reduces a probability of an access conflict.

Optionally, the second PCIe switch further includes a second host port. The second PCIe switch is connected to the second processor by using the second host port, and the second host port is not directly connected to the second fabric port.

Optionally, the first PCIe switch includes first firmware. The first firmware is configured to configure the first fabric port to reject the scanning instruction of the first processor when the first processor performs enumeration.

A manner of rejecting the scanning instruction is solidified in the PCIe switch, so that implementation complexity is reduced, and practicability is high.

Optionally, the second PCIe switch includes second firmware. The second firmware is configured to configure the second fabric port to reject the scanning instruction of the second processor when the second processor performs enumeration.

Optionally, the system further includes a basic input/output system (BIOS). The BIOS is configured to configure the first fabric port to reject the scanning instruction of the first processor when the first processor performs enumeration.

Optionally, the system further includes a BIOS. The BIOS is configured to configure the second fabric port to reject the scanning instruction of the second processor when the second processor performs enumeration.

Optionally, the system further includes a baseboard management controller (BMC). The BMC is configured to configure the first fabric port to reject the scanning instruction of the first processor when the first processor performs enumeration.

Optionally, the system further includes a BMC. The BMC is configured to configure the second fabric port to reject the scanning instruction of the second processor when the second processor performs enumeration.

Optionally, the second PCIe switch includes second firmware. The second firmware is configured to configure the second fabric port to reject the scanning instruction of the first processor when the first processor performs enumeration.

Optionally, the system further includes a BIOS. The BIOS is configured to configure the second fabric port to reject the scanning instruction of the first processor when the first processor performs enumeration.

Optionally, the system further includes a BMC. The BMC configures the second fabric port to reject the scanning instruction of the first processor when the first processor performs enumeration.

Optionally, the second PCIe switch includes a second fabric port. The second fabric port is configured to communicate with the first PCIe switch. First cross-domain routing information is configured on the first fabric port. The first processor or the first PCIe device accesses the second PCIe device based on the first cross-domain routing information. The first cross-domain routing information indicates a correspondence between address information of the second PCIe device and a port identity of the second fabric port.

In the foregoing manner, because cross-domain routing information corresponding to the external domain is configured on the PCIe switch in the local domain, an access request can be routed and forwarded in a cross-domain manner based on the cross-domain routing information. This helps enable a cross-domain P2P channel.

Optionally, the first PCIe switch includes the first fabric port. The first fabric port is configured to communicate with the second PCIe switch. Second cross-domain routing information is configured on the second fabric port. The second processor or the second PCIe device accesses the first PCIe device based on the second cross-domain routing information. The second cross-domain routing information indicates a correspondence between address information of the first PCIe device and a port identity of the first fabric port.

Optionally, the first cross-domain routing information includes a correspondence between a domain identity of the second PCIe domain and the port identity of the second fabric port, and a correspondence between the address information of the second PCIe device and the domain identity of the second PCIe domain.

Optionally, the second cross-domain routing information includes a correspondence between a domain identity of the first PCIe domain and the port identity of the first fabric port, and a correspondence between the address information of the first PCIe device and the domain identity of the first PCIe domain.

Optionally, the first PCIe switch includes a first downstream port. The first downstream port is connected to the first PCIe device. First local domain routing information is configured on the first fabric port. The first local domain routing information includes a correspondence between the address information of the first PCIe device and a port identity of the first downstream port.

In the foregoing manner, because local domain routing information is configured on the PCIe switch in the local domain, an access request sent from the external domain can reach a correct downstream port based on the local domain routing information, and then be transmitted to a PCIe device in the local domain by using the downstream port. This helps enable a cross-domain P2P channel.

Optionally, the second PCIe switch includes a second downstream port. The second downstream port is connected to the second PCIe device. Second local domain routing information is configured on the second fabric port. The second local domain routing information includes a correspondence between the address information of the second PCIe device and a port identity of the second downstream port.

Optionally, the first PCIe switch includes the first downstream port. First downstream port routing information is configured on the first downstream port. The first downstream port routing information indicates a correspondence between the address information of the second PCIe device and the port identity of the first fabric port.

In the foregoing manner, because downstream port routing information is configured on the PCIe switch in the local domain, when a PCIe device in the local domain needs to access the external domain, an access request of the local domain can reach a correct fabric port based on the downstream port routing information, and then be transmitted to the external domain by using the fabric port. This helps enable a cross-domain peer-to-peer (P2P) channel.

Optionally, the second PCIe switch includes the second downstream port. Second downstream port routing information is configured on the second downstream port. The second downstream port routing information indicates a correspondence between the address information of the first PCIe device and the port identity of the second fabric port.

Optionally, the first downstream port routing information includes a relationship between the domain identity of the second PCIe domain and the port identity of the first fabric port, and the correspondence between the address information of the second PCIe device and the domain identity of the second PCIe domain.

Optionally, the second downstream port routing information includes a relationship between the domain identity of the first PCIe domain and the port identity of the second fabric port, and the correspondence between the address information of the first PCIe device and the domain identity of the first PCIe domain.

Optionally, the address information of the first PCIe device includes an address window or a bus identity of the first PCIe device.

Optionally, the address information of the second PCIe device includes an address window or a bus identity of the second PCIe device.

Optionally, the first PCIe switch includes a first processing unit, and the first cross-domain routing information is stored in the first processing unit.

Optionally, the second PCIe switch includes a second processing unit, and the second cross-domain routing information is stored in the second processing unit.

Optionally, the first PCIe switch includes the first processing unit, and the first local domain routing information is stored in the first processing unit.

Optionally, the second PCIe switch includes the second processing unit, and the second local domain routing information is stored in the second processing unit.

Optionally, the first PCIe switch includes the first processing unit, and the first downstream port routing information is stored in the first processing unit.

Optionally, the second PCIe switch includes the second processing unit, and the second downstream port routing information is stored in the second processing unit.

Optionally, the first processor is a first central processing unit (CPU), and the second processor is a second CPU.

Optionally, the first PCIe device is a first embedded neural-network processing unit (NPU), a first tensor processing unit (TPU), or a first graphics processing unit (GPU), and the second PCIe device is a second NPU, a second TPU, or a second GPU.

Optionally, the first PCIe switch includes the first downstream port, and the first downstream port is connected to the first PCIe device in the first PCIe domain.

The first PCIe switch is configured to receive a first access request by using the first downstream port. A source PCIe device of the first access request is the first PCIe device, and a destination PCIe device of the first access request is the second PCIe device in the second PCIe domain.

The first PCIe switch is configured to add the domain identity of the second PCIe domain to the first access request.

The first PCIe switch is configured to send, to the second fabric port by using the first fabric port, the first access request including the domain identity.

Optionally, a ninth entry is configured on the first downstream port, and the ninth entry includes the correspondence between the domain identity of the second PCIe domain and the port identity of the first fabric port.

The first PCIe switch is configured to determine the first fabric port based on the first access request and the ninth entry.

Optionally, an eleventh entry is configured on the first downstream port, and the eleventh entry includes a correspondence between an address window of the second PCIe device and the domain identity of the second PCIe domain.

The first PCIe switch is configured to determine the domain identity of the second PCIe domain based on the first access request and the eleventh entry. A destination address in the first access request belongs to the address window of the second PCIe device.

Optionally, a thirteenth entry is configured on the first downstream port, and the thirteenth entry includes a correspondence between a bus identity corresponding to the second PCIe device and the port identity of the first fabric port.

The first PCIe switch is configured to determine the first fabric port based on the first access request and the thirteenth entry. The first access request includes the bus identity corresponding to the second PCIe device.

Optionally, a first entry is configured on the first fabric port, and the first entry includes the correspondence between the domain identity of the second PCIe domain and the port identity of the second fabric port.

The first PCIe switch is configured to determine the second fabric port based on the first access request and the first entry.

Optionally, the first PCIe switch includes the first downstream port, and the first downstream port is connected to the first PCIe device in the first PCIe domain.

The first PCIe switch is configured to receive a second access request by using the first fabric port. A source PCIe device of the second access request is the second PCIe device in the second PCIe domain, and a destination PCIe device of the second access request is the first PCIe device.

The first PCIe switch is configured to send the second access request to the first PCIe device by using the first downstream port.

Optionally, the first PCIe switch includes the first downstream port, and the first downstream port is connected to the first PCIe device in the first PCIe domain.

A fifth entry is configured on the first fabric port, and the fifth entry includes a correspondence between an address window of the first PCIe device and the port identity of the first downstream port.

The second PCIe switch includes the second downstream port, and the second downstream port is connected to the second PCIe device in the second PCIe domain.

The first PCIe switch is configured to determine the first downstream port based on the second access request and the fifth entry. A destination address in the second access request belongs to the address window of the first PCIe device.

Optionally, a seventh entry is configured on the first fabric port, and the seventh entry includes a correspondence between a bus identity corresponding to the first PCIe device and the port identity of the first downstream port.

The first PCIe switch is configured to determine the first downstream port based on the second access request and the seventh entry. The second access request includes the bus identity corresponding to the first PCIe device.

Optionally, a fifteenth entry is configured on the first downstream port, and the fifteenth entry includes a correspondence between an address window of the first PCIe device and an identity of the first PCIe device.

The first PCIe switch is configured to determine the first PCIe device based on the second access request and the fifteenth entry. A destination address in the second access request belongs to the address window of the first PCIe device.

Optionally, a seventeenth entry is configured on the first downstream port, and the seventeenth entry includes a correspondence between the bus identity corresponding to the first PCIe device and the identity of the first PCIe device.

The first PCIe switch is configured to determine the first PCIe device based on the second access request and the seventeenth entry. The second access request includes the bus identity corresponding to the first PCIe device.

According to a second aspect, a method applied to a multiprocessor system is provided. The method includes: providing a first PCIe domain and a second PCIe domain, where the first PCIe domain includes a first processor, a first PCIe switch connected to the first processor, and a first PCIe device connected to the first PCIe switch, the second PCIe domain includes a second processor, a second PCIe switch connected to the second processor, and a second PCIe device connected to the second PCIe switch, and the first PCIe switch communicates with the second PCIe switch by using a bus; and configuring the first PCIe domain and the second PCIe domain, to enable the second PCIe device that is in the second PCIe domain and that is connected to the second PCIe switch not to be found by the first processor when the first processor performs enumeration, where the first processor or the first PCIe device accesses the second PCIe device by using the bus.

For details of the method provided in the second aspect, refer to any one of the first aspect or the optional manners of the first aspect. The details are not described herein again.

According to a third aspect, a computer device is provided. The computer device includes a processor and a memory. The memory stores at least one instruction. When the at least one instruction is executed on the computer device, the computer device is enabled to perform the method provided in the second aspect.

According to a fourth aspect, an apparatus for configuring a multiprocessor system is provided. The apparatus is configured to configure the multiprocessor system in any one of the first aspect or the optional manners of the first aspect. The apparatus for configuring a multiprocessor system includes at least one unit. In some embodiments, the unit in the apparatus provided in the fourth aspect is implemented by using software, and the unit in the apparatus provided in the fourth aspect is a program module. In some other embodiments, the unit in the apparatus provided in the fourth aspect is implemented by hardware or firmware. For details of the apparatus provided in the fourth aspect, refer to any one of the first aspect or the optional manners of the first aspect. The details are not described herein again.

According to a fifth aspect, a computer-readable storage medium is provided. The storage medium stores at least one instruction. When the at least one instruction is executed on a computer device, the computer device is enabled to perform the method provided in the second aspect.

According to a sixth aspect, a computer program product is provided. The computer program product includes computer instructions, and the computer instructions are stored in a computer-readable storage medium. When the computer program product is executed on a computer device, the computer device is enabled to perform the method provided in the second aspect.

According to a seventh aspect, a computer device is provided. The computer device includes the multiprocessor system provided in any one of the first aspect or the optional manners of the first aspect. The computer device is, for example, a server, a host, or a personal computer.

REFERENCE NUMERALS

Figure 1:
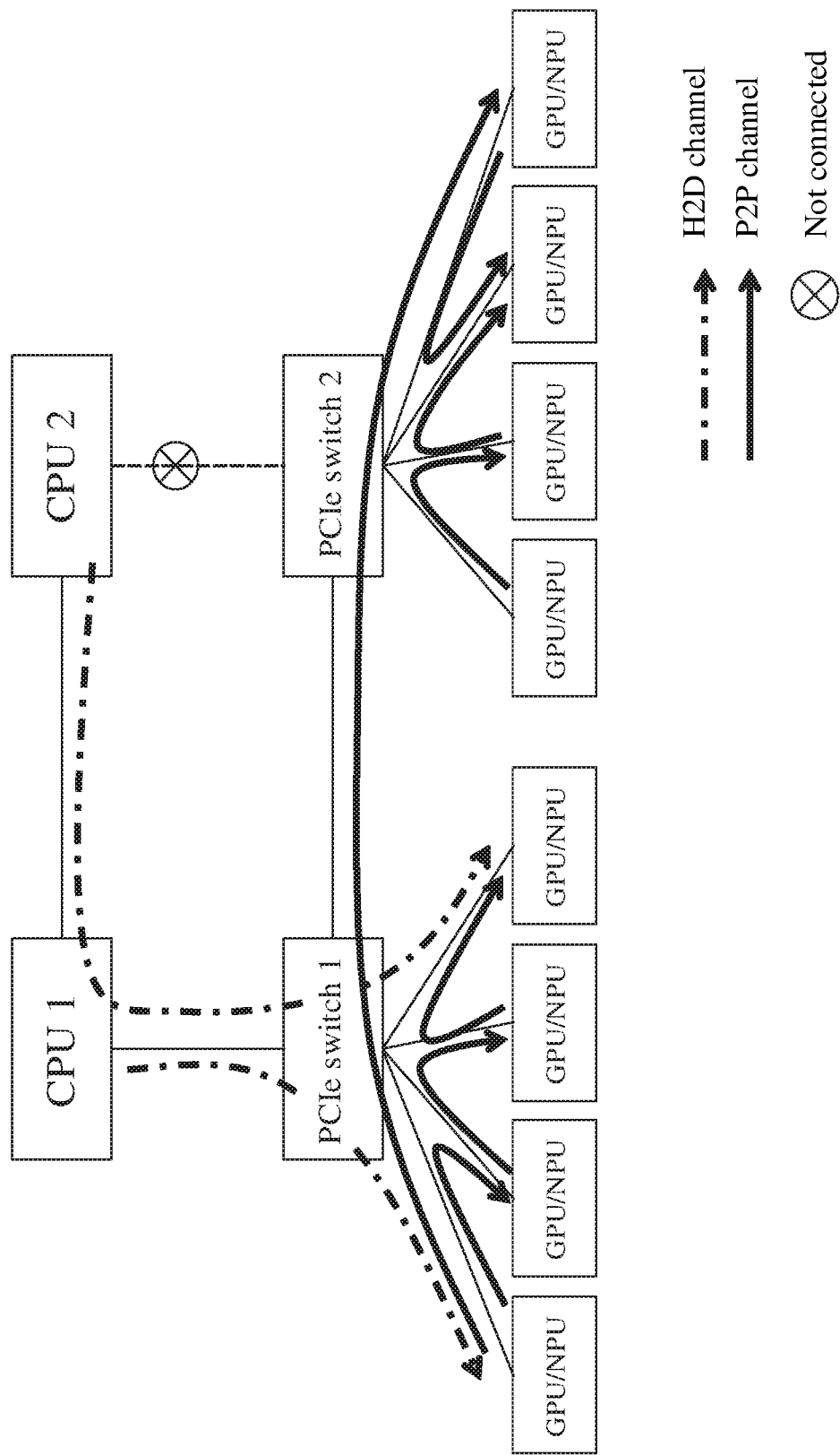
FIG. 1 is a schematic diagram of a system architecture using a P2P balanced connection method.

100: Multiprocessor system
101: First PCIe domain
102: Second PCIe domain
110: First central processing unit
111: Second central processing unit
120: First PCIe switch
1201: First host port
1202: First fabric port
1203: First downstream port
121: Second PCIe switch
1211: Second host port
1212: Second fabric port
1213: Second downstream port
130: First PCIe device
131: Second PCIe device
200: Multiprocessor system
300: Multiprocessor system
400: Software for configuring a multiprocessor system
410: Fabric configurator
420: Topology generator
430: Address allocator

DESCRIPTION OF EMBODIMENTS

To make the objectives, technical solutions, and advantages of this application clearer, the following further describes the implementations of this application in detail with reference to the accompanying drawings.

A system and a method provided in embodiments of this application can be used as a solution for implementing symmetric load of a system, and are applied to any scenario in which an H2D channel and a P2P channel need to be established. Load symmetry includes meanings in two aspects: load balancing between different CPUs and load balancing between different PCIe devices. Optionally, the system and the method provided in embodiments of this application are applied to a single-server multi-card scenario in which artificial intelligence (AI) training is performed. The following describes the single-server multi-card scenario in which AI training is performed and some cases that occur in the scenario during application.

Currently, artificial intelligence technologies are on the rise. Heterogeneous computing servers are widely used by universities and colleges, enterprises, and research institutes for AI training. In an AI training process, parameters of large traffic need to be synchronized between training devices. Therefore, a high-speed interconnected P2P channel needs to be established between the training devices. In addition, in the training process, data copy and message synchronization need to be performed between a CPU of a server and an AI acceleration computing card. Therefore, a high-speed and stable H2D channel is also needed between the CPU of the server and the training device.

The training device is usually an AI training card, for example, an AI acceleration card suitable for AI computing, such as a GPU or an embedded NPU. Generally, the AI training card is a PCIe device. The AI training card is connected to a server CPU by using a PCIe bus. Therefore, the H2D channel for AI training is usually implemented by using the PCIe bus. For P2P communication, in a single-server training scenario, a P2P channel is also usually implemented by using a PCIe bus. When the PCIe bus is used for P2P high-speed access, a PCIe bus path between all training devices is needed to be the shortest to ensure performance.

In some application scenarios, an H2D channel and a P2P channel are established by using a P2P balanced connection method or an H2D balanced connection method.

FIG. 1 is an example of performing H2D communication and P2P communication by using a PCIe bus in a P2P balanced connection method. A CPU 2 is not connected to a PCIe switch 2. The P2P balanced connection method ensures, as much as possible, a shortest access path and reliable bandwidth between training devices (GPUs or NPUs), but cannot ensure PCIe access performance between a CPU (the CPU 2 in FIG. 1) and each training device.

Figure 2:
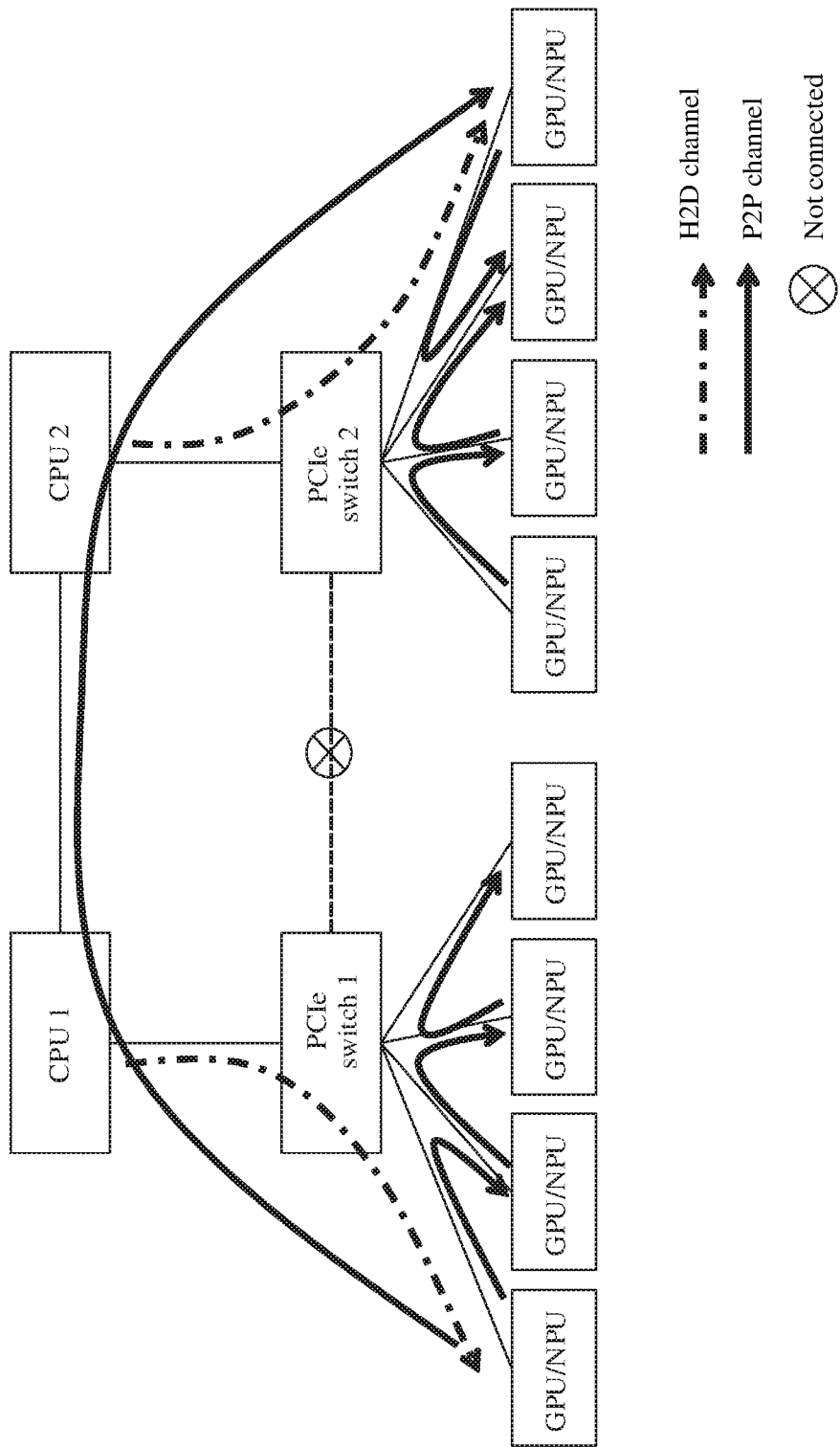
FIG. 2 is a schematic diagram of a system architecture using an H2D balanced connection method.

FIG. 2 is an example of performing H2D communication and P2P communication by using a PCIe bus in an H2D balanced connection method. A PCIe switch 1 is not connected to the PCIe switch 2. The H2D balanced connection method can be used together with a CPU pinning policy, to balance access performance between training devices (GPUs/NPUs in FIG. 2) accessed by training services on CPUs as much as possible. However, AI training devices need to synchronize parameters across CPUs, which may cause P2P communication performance unstable in most cases (for example, when CPU load is heavy).

It can be learned that neither the P2P balanced connection method nor the H2D balanced connection method can reconcile performance requirements of the H2D communication and the P2P communication. As a result, either H2D performance deteriorates (in the P2P balanced connection method) or P2P performance is affected (in the H2D balanced connection method).

Figure 3:
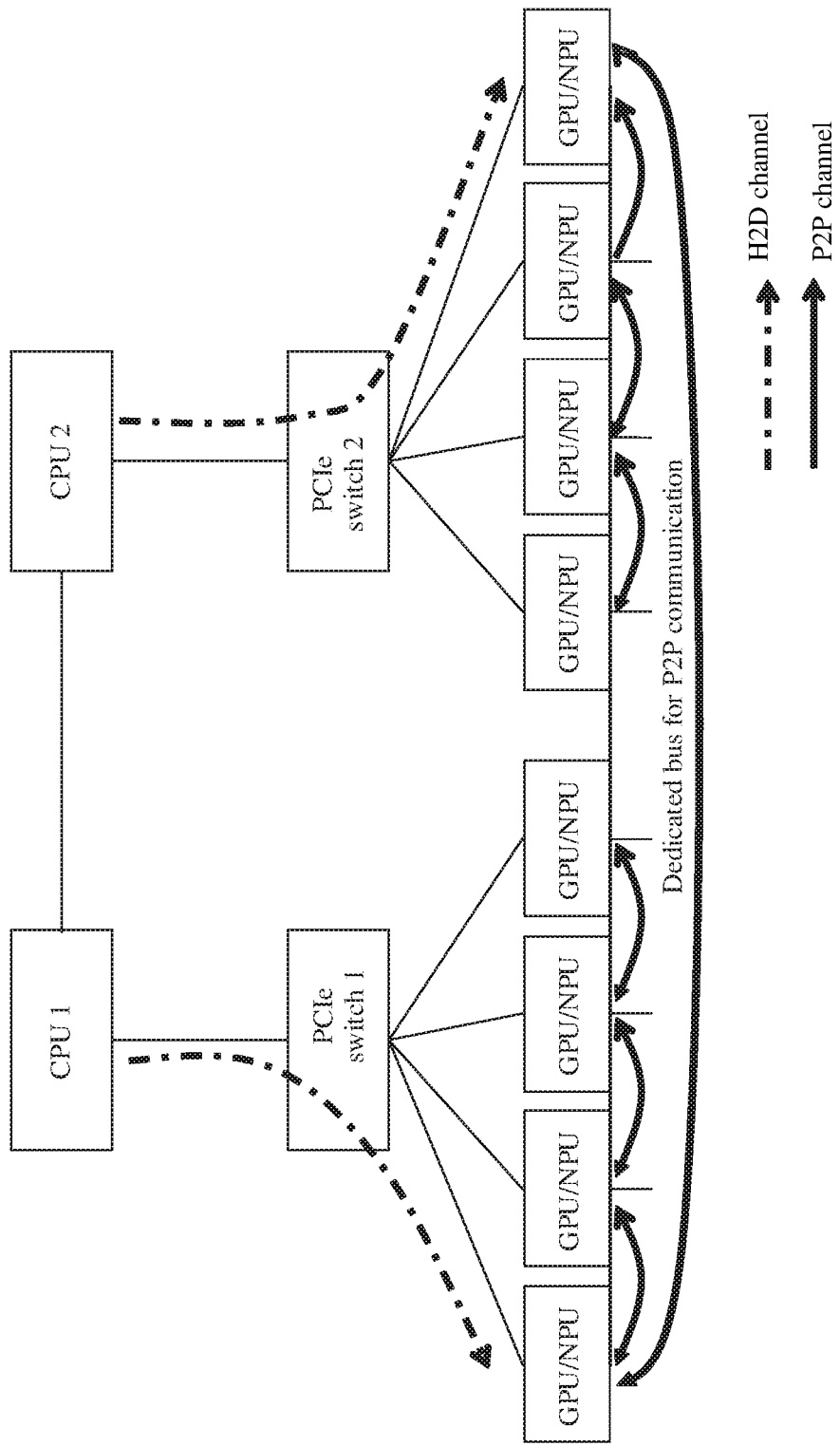
FIG. 3 is a schematic diagram of a system architecture using a dedicated bus.

In some other application scenarios, a dedicated bus for P2P communication is used, and is responsible for P2P communication between training devices. For example, as shown in FIG. 3, a dedicated bus interface corresponding to a dedicated bus is additionally developed on each training device, and the dedicated bus interface of each training device is connected to the dedicated bus, so that different training devices perform P2P communication by using the dedicated bus.

However, although the solution in which the dedicated bus is used reconciles the performance requirements of H2D and P2P, a dedicated hardware server and a training device need to be developed for the dedicated bus. This brings high costs. In addition, an application scenario of the solution in which the dedicated bus is used is limited, and the solution is not applicable to a training device without a dedicated bus interface.

In view of this, in some embodiments of this application, in a single-server multi-card training scenario, H2D communication performance of a plurality of CPUs in a server for training devices can be equal, and P2P communication capabilities of the plurality of training devices can be basically the same, so that a requirement for the foregoing application scenario is met. In addition, in the single-server multi-card training scenario, a high-speed P2P communication capability between the training devices is implemented without depending on a newly added hardware bus or increasing hardware costs. The following describes embodiments of this application from a plurality of perspectives such as a hardware system architecture, a software system architecture, and a configuration method procedure.

The following describes the hardware system architecture provided in embodiments of this application.

Figure 4:
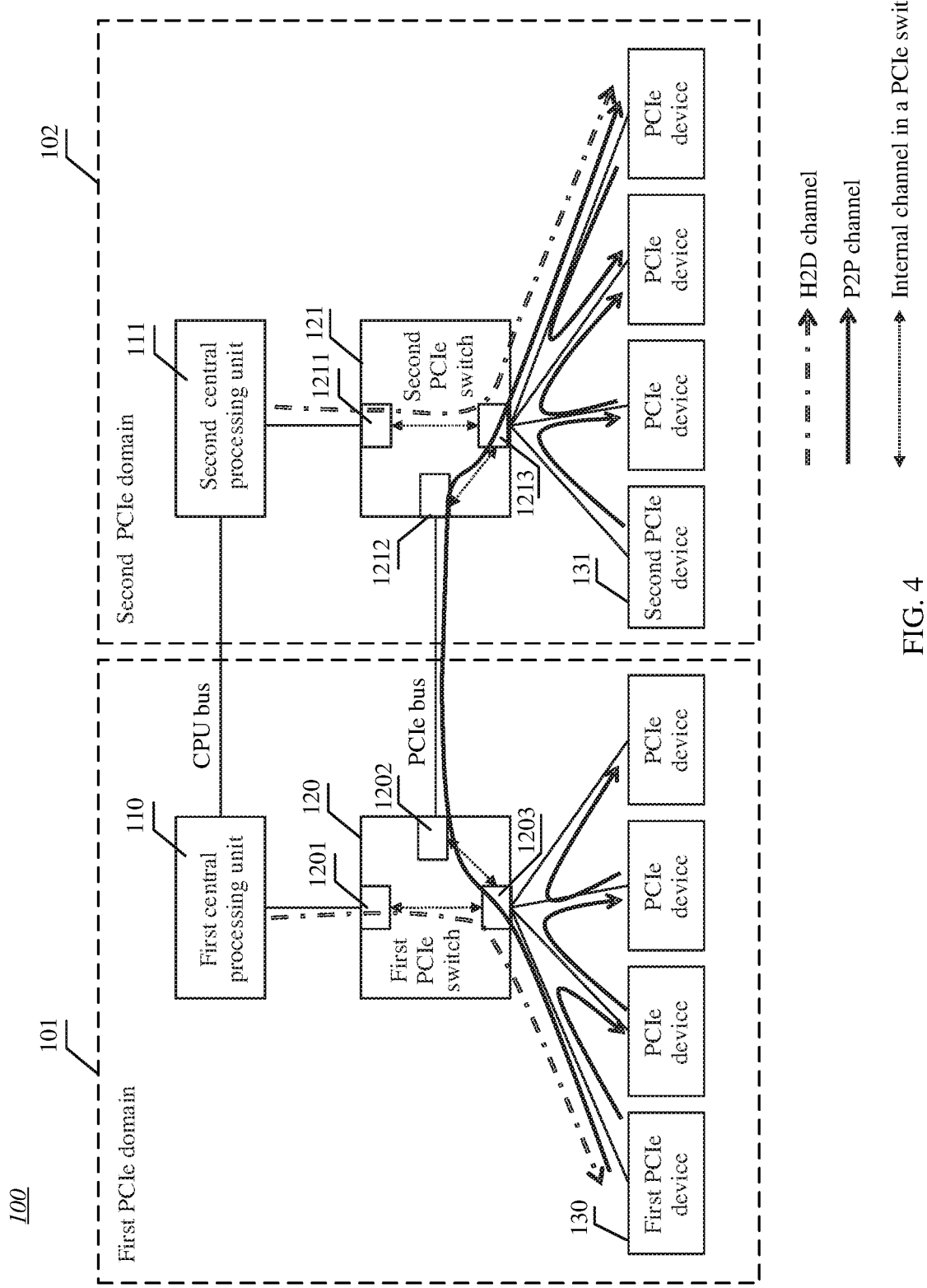
FIG. 4 is a schematic diagram of an architecture of a multiprocessor system according to an embodiment of this application.

An embodiment of this application provides a multiprocessor system. The multiprocessor system includes a plurality of CPUs, a plurality of PCIe switches (PCIe switches), and a plurality of PCIe devices. For example, referring to FIG. 4 or FIG. 5, a system 100 shown in FIG. 4 is an example of a system architecture having two CPUs, two PCIe switches, and eight PCIe devices. A system 200 shown in FIG. 5 is an example of the system 100 shown in FIG. 4.

Figure 5:
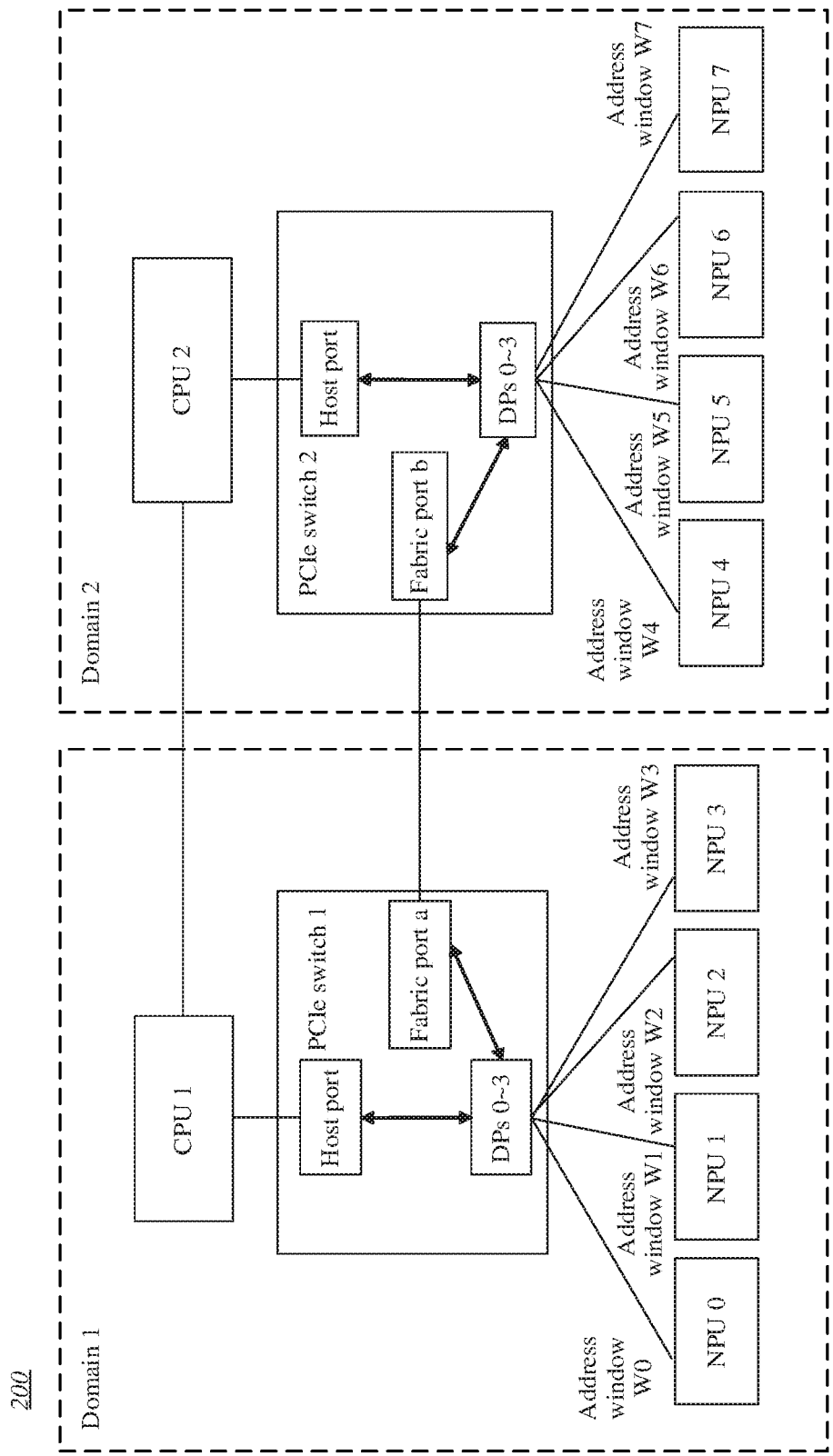
FIG. 5 is a schematic diagram of an architecture of a multiprocessor system according to an embodiment of this application.

Optionally, systems provided in embodiments, such as the system 100 shown in FIG. 4 and the system 200 shown in FIG. 5, are single-server systems. Each CPU, each PCIe switch, and each PCIe device in the multiprocessor system are integrated into a same hardware device. For example, multiprocessor systems are integrated in a same server, a same host, or a same personal computer. Alternatively, different devices in the multiprocessor system are distributed in different hardware devices.

The following describes the multiprocessor system in detail by using (1) to (16).

(1) PCIe Domain

In embodiments of this application, the terms "PCIe domain", "PCIe network", and "PCIe system" may be used interchangeably. A multiprocessor system includes a plurality of PCIe domains. One PCIe domain includes a processor, a PCIe switch connected to the processor, and a plurality of PCIe devices connected to the PCIe switch. In some of the following embodiments, an example in which the processor is a CPU is used for description. It should be noted that the processor is not limited to be a CPU in embodiments. In some other embodiments, the processor is hardware except the CPU. In other words, in the following embodiments, actions such as enumeration and accessing on a PCIe device may be performed by the hardware except the CPU.

For example, referring to FIG. 4, a first PCIe domain 101 and a second PCIe domain 102 in FIG. 4 are examples of the plurality of PCIe domains. The first PCIe domain 101 includes a first central processing unit 110, a first PCIe switch 120 connected to the first central processing unit 110, and a plurality of PCIe devices connected to the first PCIe switch 120. The plurality of PCIe devices connected to the first PCIe switch 120 include a first PCIe device 130. The second PCIe domain 102 includes a second central processing unit 111, a second PCIe switch 121 connected to the second central processing unit 111, and a plurality of PCIe devices 131 connected to the second PCIe switch 121. The plurality of PCIe devices 131 connected to the second PCIe switch 121 include a second PCIe device 131.

For example, referring to FIG. 5, CPU 1 is an example of the first central processing unit 110, a PCIe switch 1 is an example of the first PCIe switch 120, and an NPU 0, an NPU 1, an NPU 2, and an NPU 3 are examples of the PCIe devices 130. The first PCIe device 130 is, for example, any NPU of the NPU 0, the NPU 1, the NPU 2, or the NPU 3. A CPU 2 is an example of the second central processing unit 111, a PCIe switch 2 is an example of the second PCIe switch 121, and an NPU 4, an NPU 5, an NPU 6, and an NPU 7 are examples of the PCIe devices 131. The second PCIe device 131 is, for example, any NPU of the NPU 4, the NPU 5, the NPU 6, and the NPU 7.

(2) Topology Structure of a Multiprocessor System

Each PCIe domain in the multiprocessor system has a tree topology structure. A PCIe domain having a tree topology structure is also referred to as a PCIe tree or a PCIe topology tree. A root node in the PCIe topology tree is a CPU, and a leaf node in the PCIe topology tree is a PCIe device.

In some embodiments, the CPU is integrated with a root complex (RC). In some other embodiments, the CPU and the RC are disposed separately. The RC is configured to connect a processor and a memory subsystem to one or more PCIe switches. The RC is configured to generate an access request on behalf of the CPU.

In each PCIe domain, each PCIe port and each PCIe device are allocated with a unique bus number, PCIe device number, and function number. For example, referring to FIG. 4, the system 100 shown in FIG. 4 includes two PCIe topology trees (that is, two PCIe domains). In one PCIe topology tree, the first central processing unit 110 is used as a root node, and the PCIe devices 130 are used as leaf nodes. In the other PCIe topology tree, the second central processing unit 111 is used as a root node, and the PCIe devices 131 are used as leaf nodes. For another example, referring to FIG. 5, the system 200 shown in FIG. 5 includes two PCIe topology trees (that is, two PCIe domains). In one PCIe topology tree, the CPU 1 is used as a root node, and the NPU 0, the NPU 1, the NPU 2, and the NPU 3 are used as leaf nodes. In the other PCIe topology tree, the CPU 2 is used as a root node, and the NPU 4, the NPU 5, the NPU 6, and the NPU 7 are used as leaf nodes.

(3) Domain Identity (ID)

In some embodiments, a PCIe domain in a multiprocessor system is identified by using a domain ID. PCIe devices in a same PCIe domain have a same domain ID. PCIe devices in different PCIe domains have different domain IDs. For example, referring to FIG. 5, a domain 1 in FIG. 5 is an example of the first PCIe domain 101, and a domain identity of the domain 1 is, for example, 1 or domain1. A domain 2 in FIG. 5 is an example of the second PCIe domain 102, and a domain identity of the domain 2 is, for example, 2 or domain2.

(4) PCIe Switch

The PCIe switch is configured to forward access requests of devices in different PCIe domains or a same PCIe domain. The PCIe switch includes a plurality of PCIe ports. Different PCIe ports have different functions and connection objects. In an example, the PCIe switch includes a fabric port, a downstream port (DP), and a host port.

(5) Fabric Port

The fabric port is configured to communicate with another PCIe switch. Fabric ports of different PCIe switches are connected. One PCIe switch includes one or more fabric ports. When a PCIe switch includes a plurality of fabric ports, different fabric ports are connected to different PCIe switches. For example, referring to FIG. 4, the first PCIe switch 120 includes a first fabric port 1202, the second PCIe switch 121 includes a second fabric port 1212, and the second fabric port 1212 is connected to the first fabric port 1202 by using a PCIe bus. The first fabric port 1202 is configured to communicate with the second PCIe switch 121. The second fabric port 1212 is configured to communicate with the first PCIe switch 120. For example, referring to FIG. 5, the PCIe switch 1 includes a fabric port a, the PCIe switch 2 includes a fabric port b, and the fabric port a and the fabric port b are connected by using a PCIe bus. The fabric port a is an example of the first fabric port 1202, and the fabric port b is an example of the second fabric port 1212.

(6) Downstream Port

The downstream port is used to communicate with a PCIe device. A downstream port of a PCIe switch is connected to the PCIe device. One PCIe switch includes at least one downstream port, and each downstream port is connected to at least one PCIe device.

For example, referring to FIG. 4, the first PCIe switch 120 includes a first downstream port 1203, and the first downstream port 1203 is connected to the first PCIe device 130 in the first PCIe domain 101. The second PCIe switch 121 includes a second downstream port 1213, and the second downstream port 1213 is connected to the second PCIe device 131 in the second PCIe domain 102.

For example, referring to FIG. 5, the downstream port is referred to as DP for short in FIG. 5, and four downstream ports are referred to as DPs 0~3 for short. A DP 0 of the PCIe switch 1 is connected to the NPU 0, a DP 1 of the PCIe switch 1 is connected to the NPU 1, a DP 2 of the PCIe switch 1 is connected to the NPU 2, and a DP 3 of the PCIe switch 1 is connected to the NPU 3. A DP 0 of the PCIe switch 2 is connected to the NPU 4, a DP 1 of the PCIe switch 2 is connected to the NPU 5, a DP 2 of the PCIe switch 2 is connected to the NPU 6, and a DP 3 of the PCIe switch 2 is connected to the NPU 7. The NPU 0, the NPU 1, the NPU 2, or the NPU 3 is an example of the first PCIe device 130. The NPU 4, the NPU 5, the NPU 6, or the NPU 7 is an example of the second PCIe device 131.

(7) Host Port

The host port is configured to communicate with a central processing unit. A host port of a PCIe switch is connected to the central processing unit. For example, referring to FIG. 4, the first PCIe switch 120 includes a first host port 1201, and the first host port 1201 is connected to the first central processing unit 110. The second PCIe switch 121 includes a second host port 1211, and the second host port 1211 is connected to the second central processing unit 111. For example, referring to FIG. 5, a host port of the PCIe switch 1 is connected to the CPU 1. A host port of the PCIe switch 2 is connected to the CPU 2.

(8) Management Port

Figure 7:
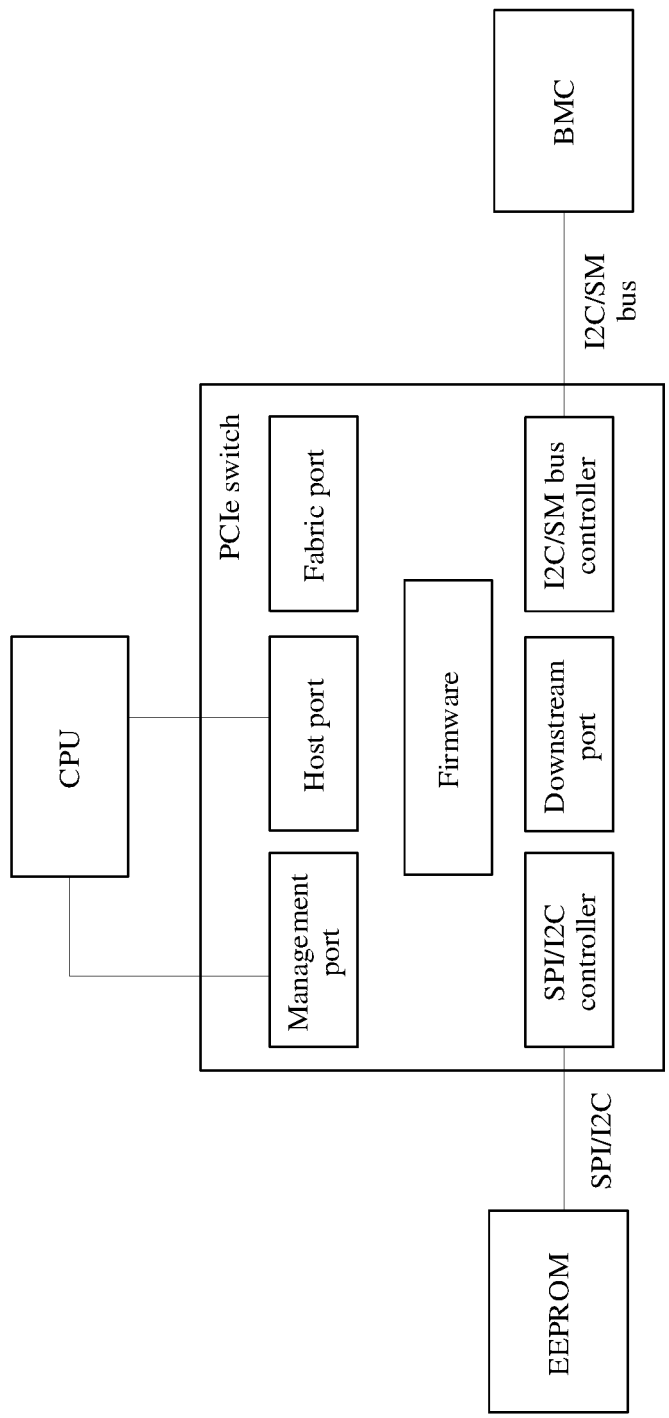
FIG. 7 is a schematic diagram of a structure of a PCIe switch according to an embodiment of this application.

In some embodiments, referring to FIG. 7, a PCIe switch further includes a management port. The management port is connected to a central processing unit. The management port is configured to receive a configuration instruction from the central processing unit.

(9) Firmware

In some embodiments, referring to FIG. 7, the PCIe switch further includes firmware (firmware). The firmware includes program code for implementing a function related to the PCIe switch. The PCIe switch executes the program code in the firmware, to perform the method corresponding to the PCIe switch in this embodiment.

(10) PCIe Device

In some embodiments, a PCIe device is a processor. For example, the PCIe device is an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof. The PCIe device is, for example, a single-core processor or a multi-core processor.

In some other embodiments, a PCIe device is a peripheral device. For example, the PCIe device is an output device or an input device. The output device communicates with a central processing unit and can display information. For example, the output device is a liquid-crystal display (LCD), a light-emitting diode (LED) display device, a cathode-ray tube (CRT) display device, a projector, or the like. The input device communicates with the central processing unit, and can receive a user input. For example, the input device may be a mouse, a keyboard, a touchscreen device, or a sensing device.

In some embodiments, a PCIe device is a training device. The training device is a device configured to perform an AI training task. For example, the PCIe device is an AI processor (which is also referred to as an AI training card). For example, the PCIe device is a GPU, an NPU, a TPU, or another chip customized for machine learning. The AI training task includes but is not limited to at least one of calculating a gradient value and calculating a model parameter.

In some other embodiments, a PCIe device is a computing device of another type other than a training device. For example, the PCIe device is an acceleration card of any type or a dedicated processor.

In some other embodiments, a PCIe device is a storage device. For example, the PCIe device is a solid-state drive (SSD), a hard disk drive (HDD), or a dual in-line memory module (DIMM).

In some other embodiments, a PCIe device is a network device. For example, the PCIe device is a network interface card (NIC).

(11) Connection Relationship Between a Central Processing Unit and a PCIe Switch In some embodiments, a central processing unit and a PCIe switch in a same PCIe domain are connected by using a PCIe bus. For example, in the scenario shown in FIG. 4, the first central processing unit 110 is connected to the first PCIe switch 120 by using a PCIe bus. The second central processing unit 111 is connected to the second PCIe switch 121 by using a PCIe bus.

(12) Connection Relationship Between a PCIe Switch and a PCIe Device

In some embodiments, a PCIe switch and each PCIe device in a same PCIe domain are connected by using a PCIe bus. For example, in the scenario shown in FIG. 4, the first PCIe switch 120 is connected to the first PCIe device 130 by using a PCIe bus. The second PCIe switch 121 is connected to the second PCIe device 131 by using a PCIe bus. For example, referring to FIG. 5, the PCIe switch 1 is connected to four NPUs by using four PCIe buses. In an example, the PCIe switch 1 is connected to the NPU 0 by using a bus 10, the PCIe switch 1 is connected to the NPU 1 by using a bus 11, the PCIe switch 1 is connected to the NPU 2 by using a bus 12, and the PCIe switch 1 is connected to the NPU 3 by using a bus 13. The PCIe switch 2 is connected to four NPUs by using four PCIe buses. In an example, the PCIe switch 2 is connected to the NPU 4 by using a bus 80, the PCIe switch 2 is connected to the NPU 5 by using a bus 81, the PCIe switch 2 is connected to the NPU 6 by using a bus 82, and the PCIe switch 2 is connected to the NPU 7 by using a bus 83.

(13) Connection Relationship Between Different PCIe Switches

In some embodiments, PCIe switches in different PCIe domains are connected by using a bus (for example, a PCIe bus), and the PCIe switches in the different PCIe domains communicate with each other by using the bus. Therefore, a connection relationship is established between the different PCIe domains by using the PCIe switches and the bus, so that communication can be performed based on the connection relationship.

For example, in the scenario shown in FIG. 4, the first PCIe switch 120 is connected to the second PCIe switch 121 by using a PCIe bus, and the first PCIe switch 120 communicates with the second PCIe switch 121 by using the PCIe bus and a PCIe-related communication protocol. Because the first PCIe switch 120 communicates with the second PCIe switch 121 by using the PCIe bus, the first processor or the first PCIe device 130 accesses the second PCIe device 131 by using the PCIe bus, and the second processor or the second PCIe device 131 accesses the first PCIe device 130 by using the PCIe bus. For example, referring to FIG. 5, the PCIe switch 1 is connected to the PCIe switch 2 by using a PCIe bus.

It should be noted that, in embodiments, it is not limited that a bus for connecting different PCIe switches needs to be a PCIe bus. In some other embodiments, a bus for connecting different PCIe switches not only includes a PCIe bus, but also includes a bus of another type. For example, a connection relationship between the first PCIe switch 120 and the second PCIe switch may alternatively be: first PCIe switch 120-PCIe bus-bus of another type-PCIe bus-second PCIe switch 121.

It should be further noted that, in embodiments, it is not limited that there is only one bus for connecting different PCIe switches. In some other embodiments, a bus for connecting different PCIe switches includes a plurality of buses.

It should be further noted that the PCIe bus is an example of a bus for connecting different PCIe switches. In some other embodiments, different PCIe switches are connected not by using a PCIe bus, but by using another bus other than the PCIe bus. A type of the bus for connecting different PCIe switches is not limited in embodiments.

(14) Connection Relationship Between Central Processing Units in Different PCIe Domains In some embodiments, central processing units in different PCIe domains in a multiprocessor system are connected by using a CPU bus. For example, in the scenario shown in FIG. 4, the first central processing unit 110 is connected to the second central processing unit 111 by using a CPU bus. For example, referring to FIG. 5, the CPU 1 and the CPU 2 are connected by using a CPU bus.

(15) Baseboard Management Controller (BMC)

In some embodiments, referring to FIG. 7, a multiprocessor system further includes a BMC. The BMC is connected to each PCIe switch in the system. For example, an out-of-band channel is established between the PCIe switch and the BMC. As shown in FIG. 7, in some embodiments, the out-of-band channel is established by using an Inter-Integrated Circuit (I2C) bus, and the PCIe switch manages, by using an I2C controller (I2C controller), a PCIe port connected to the BMC. In some other embodiments, an out-of-band channel is established by using a system management bus (SMbus), and the PCIe switch manages, by using an SMbus controller, a PCIe port connected to the BMC.

(16) Relationship Between a Host Port and a Fabric Port

In some embodiments, a host port is not directly connected to a fabric port. For example, referring to FIG. 4, the first host port 1201 of the first PCIe switch 120 is not directly connected to the first fabric port 1202 of the first PCIe switch 120. The second host port 1211 of the second PCIe switch 121 is not directly connected to the second fabric port 1212 of the second PCIe switch 121.

The term "not directly connected" means that the two types of ports, namely, the host port and the fabric port, are not connected by using a line. It should be noted that the term "not directly connected" does not exclude a case of indirect connection. In other words, the host port and the fabric port may be indirectly connected. For example, although the first host port 1201 is not directly connected to the first fabric port 1202 by using a line, the first host port 1201 is connected to another device, and the other device is connected to the first fabric port 1202. This case also falls within the scope of "the first host port is not directly connected to the first fabric port".

Because the host port is not directly connected to the fabric port, a processor in a local domain is prevented from finding a PCIe device in a peer domain based on a hardware connection relationship. Therefore, this implementation helps a feature that "a PCIe device in a peer domain is not found by a processor in a local domain" be more reliable, and further reduces a probability of an access conflict. For example, because the first host port 1201 is not directly connected to the first fabric port 1202, the first central processing unit 110 is prevented from finding the second PCIe device 131 based on a hardware connection relationship (for example, the first host port 1201→the first fabric port 1202→the second fabric port 1212→the second PCIe device 131). This helps a feature that "the second PCIe device 131 is not found by the first central processing unit 110" be more reliable.

It should be noted that a quantity of CPUs in the multiprocessor system is not limited in embodiments. Scenarios of two CPUs shown in FIG. 4 and FIG. 5 are merely examples for description. In some other embodiments, the multiprocessor system has more than two CPUs.

It should be further noted that a quantity of PCIe devices in the multiprocessor system is not limited in embodiments. Scenarios of eight PCIe devices shown in FIG. 4 and FIG. 5 are merely examples for description. In some other embodiments, a quantity of PCIe devices in the multiprocessor system is less than 8. For example, the multiprocessor system has four PCIe devices. In some other embodiments, a quantity of PCIe devices in the multiprocessor system is greater than 8. For example, the quantity of PCIe devices in the multiprocessor system is dozens, hundreds, or more.

The foregoing describes the hardware architecture of the multiprocessor system. The following describes the software architecture of the multiprocessor system with reference to FIG. 8.

Figure 8:
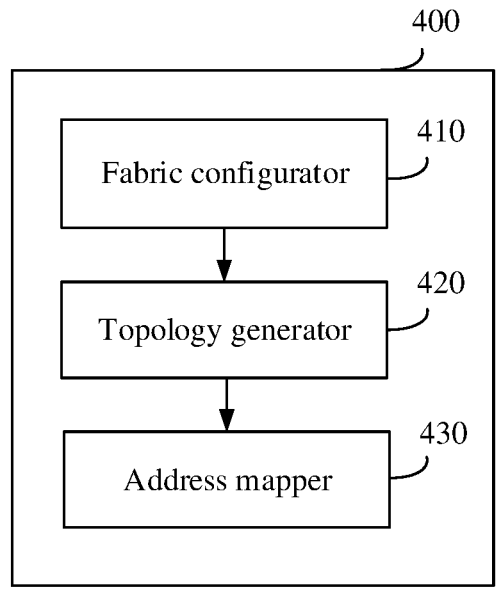
FIG. 8 is a schematic diagram of software for configuring a multiprocessor system according to an embodiment of this application.

Referring to FIG. 8, software 400 is an example of a software architecture of the system 100 or the system 200 described above. The software 400 includes a fabric configurator 410, a topology generator 420, and an address allocator 430. The fabric configurator 410, the topology generator 420, and the address allocator 430 are software modules. For example, the fabric configurator 410, the topology generator 420, and the address allocator 430 are all modules generated after a processor reads program code stored in a memory. The software 400 is, for example, PCIe initialization configuration software.

The fabric configurator 410 is used to deliver a mode configuration instruction to a PCIe switch, and the mode configuration instruction is used to configure a mode of the PCIe switch to a fabric mode. In some embodiments, the fabric configurator 410 runs in a BMC, and delivers a mode configuration instruction as the BMC starts. In some other embodiments, if an interconnection relationship is fixed and does not need to be switched, the fabric configurator 410 is solidified in firmware configuration of a PCIe switch. Each time the system starts, a specified interconnection relationship is automatically configured by the fabric configurator 410.

The topology generator 420 is used to generate a topology relationship between a PCIe device and a CPU. For example, the topology generator 420 generates a topology relationship between the PCIe device and the CPU based on a PCIe scanning algorithm. In some embodiments, the topology generator 420 is used to allocate a domain identity. For example, the topology generator 420 allocates different domain IDs to all PCIe domains in the system. In some embodiments, the topology generator 420 runs in a BIOS.

An address mapper is used to configure routing information of a PCIe port, so that the PCIe port routes and forwards an access request based on the routing information. For example, the address mapper generates routing information based on an address and an ID of each PCIe device in each PCIe domain divided by the topology generator 420; and the address mapper carries the generated routing information in a configuration instruction, and delivers the configuration instruction to a fabric port and a downstream port, to configure the routing information on the fabric port and the downstream port. In some embodiments, the address mapper is software running on a CPU. For example, the address mapper runs in a BIOS.

In embodiments, it is not limited that all the software 400 runs on THE same hardware. In some embodiments, the modules in the software 400 separately run on different hardware. For example, some modules run on a CPU, some modules run on a BMC, and the other modules run on a PCIe switch. For example, both the topology generator 420 and the address allocator 430 run on a CPU, and the fabric configurator 410 is firmware of a PCIe switch, or the fabric configurator 410 is software running on a BMC. In some other embodiments, all software modules in the software 400 run on a CPU, or all software modules run on a BMC, or all software modules run on a PCIe switch.

The hardware architecture and software architecture of the multiprocessor system are described above. The multiprocessor system described above is an improved version of an existing PCIe-based system architecture, and implements a connection between two domains. When the processor in the local domain performs enumeration, the PCIe device in the external domain is not found by the processor in the local domain. Therefore, the PCIe device in the external domain is hidden from the processor in the local domain, so that an access conflict triggered when the PCIe device in the external domain is found by the processor in the local domain is avoided. Therefore, when PCIe switches in the two domains are interconnected, a device such as the processor or a PCIe device in the local domain can still normally access the PCIe device in the external domain. This improves communication reliability of cross-domain access. In addition, a communication path of the cross-domain access is established by using a bus and the PCIe switches in the two domains, and does not depend on forwarding of a processor. This helps shorten the communication path of the cross-domain access, and reduces a delay of the cross-domain access when the access conflict is avoided.

For example, in the system shown in FIG. 4, when the first processor performs enumeration, the second PCIe device 131 that is in the second PCIe domain and that is connected to the second PCIe switch is not found by the first processor. When the second processor performs enumeration, the first PCIe device 130 that is in the first PCIe domain and that is connected to the first PCIe switch is not found by the second processor. In this case, because the processors in the two domains do not find a PCIe device in the peer domain, no error occurs when enumeration is performed in the two domains when PCIe switches in the two domains are interconnected.

There is a plurality of implementations of a feature that "a PCIe device in an external domain is not found by a processor in a local domain". In some of the following embodiments, an example in which the feature is implemented by "rejecting a scanning instruction of a processor" is used for description.

It should be noted that, in embodiments, it is not limited that "a PCIe device in an external domain is not found by a processor in the local domain" is implemented by configuring a device in a specific domain to reject the scanning instruction of the processor. In some embodiments, a fabric port in a PCIe switch in a local domain is configured to reject a scanning instruction of a processor in the local domain in an enumeration process, so as to prevent the processor in the local domain from finding a PCIe device in an external domain by using the PCIe switch in the local domain. In some other embodiments, a fabric port in a PCIe switch in an external domain is configured to reject a scanning instruction of a central processing unit in a local domain in an enumeration process, so as to prevent a processor in the local domain from finding a PCIe device in the external domain by using the PCIe switch in the external domain.

In some other embodiments, "a PCIe device in an external domain is not found by a processor in a local domain" may be implemented in another manner other than "rejecting a scanning instruction of the processor". An implementation of "a PCIe device in an external domain is not found by a processor in a local domain" is not limited in embodiments.

The following describes a method for configuring the system architecture described above.

Figure 9:
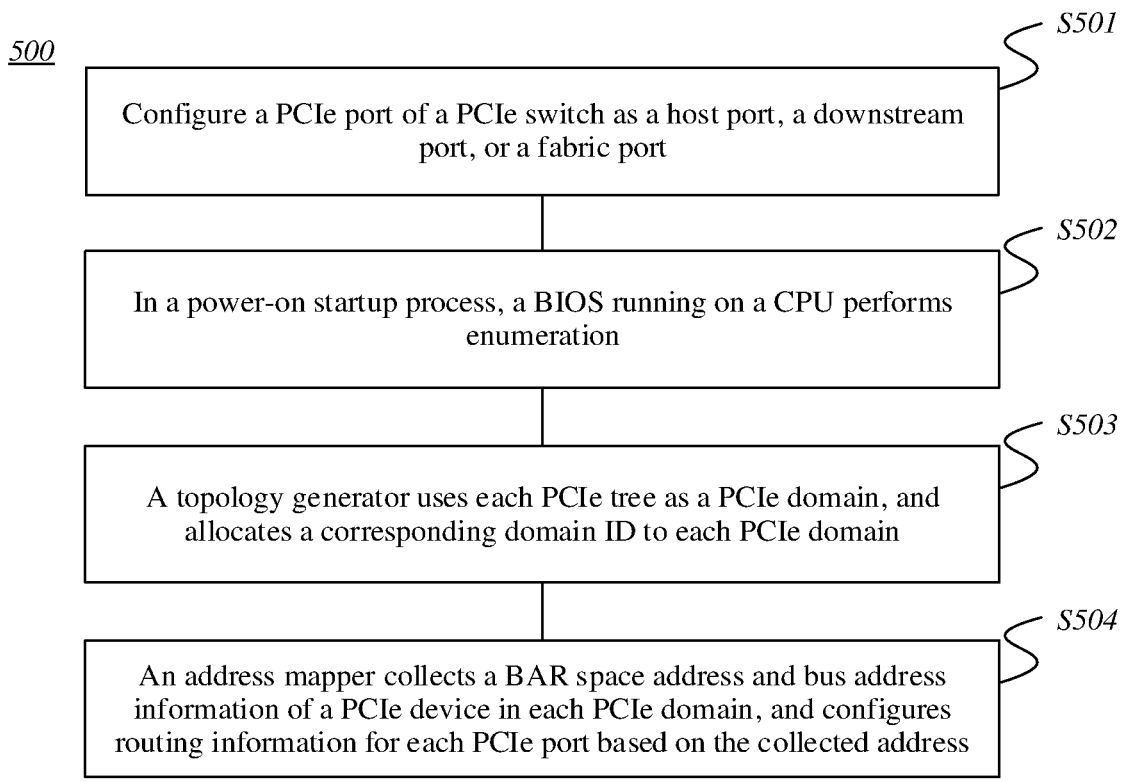
FIG. 9 is a flowchart of a method for configuring a multiprocessor system according to an embodiment of this application.

As shown in FIG. 9, a method 500 for configuring a multiprocessor system includes, for example, the following step S501 to step S504.

Step S501: Configure a PCIe port of a PCIe switch as a host port, a downstream port, or a fabric port.

From a perspective of hardware, step S501 is performed, for example, by a central processing unit, a BMC, or a PCIe switch. For example, in the system shown in FIG. 4, the first central processing unit 110 performs S501 for the first PCIe switch 120, and the second central processing unit 111 performs S501 for the second PCIe switch 121. For another example, the BMC separately performs S501 for the first PCIe switch 120 and the second PCIe switch 121. For another example, the first PCIe switch 120 performs S501 by using first firmware, and the second PCIe switch 121 performs S501 by using second firmware.

From a perspective of software, step S501 is performed, for example, by a fabric configurator. For example, the fabric configurator is first burnt to firmware of a PCIe switch, and then the fabric configurator runs to perform step S501.

That the fabric configurator performs S501 is used as an example. S501 may include the following S5011 to S5013.

S5011: The fabric configurator determines, from a plurality of PCIe ports of the PCIe switch, a PCIe port connected to a CPU, and configures the PCIe port connected to the CPU as a host port.

S5012: The fabric configurator determines, from the plurality of PCIe ports of the PCIe switch, a PCIe port connected to a PCIe device, and configures the PCIe port connected to the PCIe device as a downstream port.

For example, in the scenario of two CPUs and eight NPUs shown in FIG. 5, a fabric configurator running on the CPU 1 or the PCIe switch 1 determines four PCIe ports that are on the PCIe switch 1 and that are connected to the four NPUs: the NPU 0 to the NPU 3. The fabric configurator configures the four PCIe ports, respectively connected to the four NPUs, as four downstream ports. Similarly, a fabric configurator running on the CPU 2 or the PCIe switch 2 determines four PCIe ports that are on the PCIe switch 2 and that are connected to the four NPUs: the NPU 4 to the NPU 7. The fabric configurator configures the four PCIe ports, respectively connected to the four NPUs, as four downstream ports.

S5013: The fabric configurator determines, from the plurality of PCIe ports of the PCIe switch, a PCIe port connected to another PCIe switch, and configures the PCIe port connected to the another PCIe switch as a fabric port.

For example, in the scenario of two CPUs and eight NPUs shown in FIG. 5, the fabric configurator running on the CPU 1 or the PCIe switch 1 determines a PCIe port that is on the PCIe switch 1 and that is connected to the PCIe switch 2. The fabric configurator configures the PCIe port connected to the PCIe switch 2 as the fabric port a. Similarly, the fabric configurator running on the CPU 2 or the PCIe switch 2 determines a PCIe port that is on the PCIe switch 2 and that is connected to the PCIe switch 1. The fabric configurator configures the PCIe port connected to the PCIe switch 1 as the fabric port b.

Step S502: In a power-on startup process, a BIOS running on the CPU performs enumeration.

Enumeration refers to a process in which a processor (such as the CPU) finds a PCIe device after startup. The processor performs enumeration, to know specific PCIe devices in the system, so as to allocate address space (such as a bus number and an address window) to each PCIe device. Enumeration is performed, for example, during system initialization.

A scanning instruction is an instruction sent by the processor when performing enumeration. In an example, in an enumeration process, the processor sends a scanning instruction. After the PCIe device receives the scanning instruction, the PCIe device responds to the scanning instruction, generates a reply message, and sends the reply message to the processor. After receiving the reply message, the processor allocates address space to the PCIe device.

In the enumeration process, the fabric port of the PCIe switch rejects the scanning instruction of the BIOS, so that the PCIe switch is hidden from the CPU. The host port and the downstream port normally respond to the scanning instruction and a configuration command of the BIOS, so that the host port and the downstream port are visible to the CPU. A PCIe tree topology structure is scanned through the enumeration. After the enumeration is complete, each CPU has an independent PCIe tree.

Step S503: A topology generator uses each PCIe tree as a PCIe domain, and allocates a corresponding domain ID to each PCIe domain. Domain IDs allocated to different PCIe domains are different.

Step S504: An address mapper collects a base address register (base address register, BAR) space address and bus address information of a PCIe device in each PCIe domain, and configures routing information for each PCIe port based on the collected address.

The foregoing describes an overall process of the configuration method. The following uses an example to describe how to configure a fabric port and how to configure routing information.

A fabric port of a PCIe switch is configured to reject a scanning instruction of a central processing unit in an enumeration process. A downstream port and a host port in the PCIe switch are configured to respond to the scanning instruction of the central processing unit in the enumeration process.

For example, a fabric port of a PCIe switch in a local domain is configured to reject a scanning instruction of a processor in the local domain in an enumeration process. In this case, as shown in FIG. 4, the first PCIe switch 120 includes the first fabric port 1202, the first downstream port 1203, and the first host port 1201. The first fabric port 1202 is configured to reject a scanning instruction of the first central processing unit 110 when the first central processing unit 110 performs enumeration, the first downstream port 1203 is configured to respond to the scanning instruction of the first central processing unit 110 when the first central processing unit 110 performs the enumeration, and the first host port 1201 is configured to respond to the scanning instruction of the first central processing unit 110 when the first central processing unit 110 performs the enumeration.

Similarly, the second PCIe switch 121 includes the second fabric port 1212, the second downstream port 1213, and the second host port 1211. The second fabric port 1212 is configured to reject a scanning instruction of the second central processing unit 111 when the second central processing unit 111 performs enumeration, the second downstream port 1213 is configured to respond to the scanning instruction of the second central processing unit 111 when the second central processing unit 111 performs the enumeration, and the second host port 1211 is configured to respond to the scanning instruction of the second central processing unit 111 when the second central processing unit 111 performs the enumeration.

For another example, a fabric port of a PCIe switch in an external domain is configured to reject a scanning instruction of a processor in a local domain in an enumeration process. In this case, the second fabric port 1212 is configured to reject a scanning instruction of the first central processing unit 110 when the first central processing unit 110 performs enumeration. The first fabric port 1202 is configured to reject a scanning instruction of the second central processing unit 111 when the second central processing unit 111 performs enumeration.

The fabric port is configured, in a plurality of implementations, to reject the scanning instruction. The following uses three implementations, namely, Implementation 1, Implementation 2, and Implementation 3, as examples for description.

Implementation 1: Configuration is performed by a BIOS.

In Implementation 1, the BIOS is responsible for configuring the fabric port in the PCIe switch to reject a scanning instruction of the first central processing unit 110 and/or a scanning instruction of the second central processing unit 111 in an enumeration process.

In some embodiments, the action of configuring the fabric port by the BIOS is implemented by interacting with a management port of the PCIe switch. For example, referring to FIG. 7, the BIOS running on the CPU generates a configuration instruction, and delivers the configuration instruction to the management port. The configuration instruction is used to instruct to reject a scanning instruction of the first central processing unit 110 and/or a scanning instruction of the second central processing unit 111 in an enumeration process. The PCIe switch receives the configuration instruction by using the management port, and configures, in response to the configuration instruction, the fabric port to reject the scanning instruction of the first central processing unit 110 and/or the scanning instruction the second central processing unit 111. In some embodiments, the action of configuring the fabric port is implemented by accessing a register of the fabric port. For example, the management port sends the configuration instruction to firmware of the PCIe switch, the firmware of the PCIe switch writes the configuration instruction into the register of the fabric port, and the register of the fabric port stores the configuration instruction. In the enumeration process, the fabric port reads the configuration instruction from the register and executes the configuration instruction. In this way, the fabric port rejects the scanning instruction of the BIOS. For example, in the system architecture shown in FIG. 4, the BIOS is configured to configure both the first fabric port 1202 and the second fabric port 1212 to reject a scanning instruction of the first central processing unit 110 and/or a scanning instruction of the second central processing unit 111 in an enumeration process.

It should be noted that a specific CPU on which the BIOS configured to configure the fabric port to reject the scanning instruction runs is not limited in embodiments. In the example of the system architecture shown in FIG. 4, the CPU that configures the fabric port to reject the scanning instruction includes but is not limited to the following Case 1 to Case 4.

Case 1: The BIOS includes a plurality of threads, and different threads of the BIOS run on different central processing units. Optionally, in this case, different central processing units configure, by using the different threads of the BIOS, both the first fabric port 1202 and the second fabric port 1212 to reject a scanning instruction in an enumeration process. For example, the BIOS includes a first thread and a second thread, the first thread runs on the first central processing unit 110, and the second thread runs on the second central processing unit 111. Optionally, in this case, the first central processing unit 110 configures, by using the first thread, the first fabric port 1202 to reject a scanning instruction in an enumeration process, and the second central processing unit 111 configures, by using the second thread, the second fabric port 1212 to reject a scanning instruction in an enumeration process.

Case 2: The BIOS runs on the first central processing unit 110. Optionally, in this case, the first central processing unit 110 configures, by using the BIOS, both the first fabric port 1202 and the second fabric port 1212 to reject a scanning instruction in an enumeration process.

Case 3: The BIOS runs on the second central processing unit 111. Optionally, in this case, the second central processing unit 111 configures, by using the BIOS, both the first fabric port 1202 and the second fabric port 1212 to reject a scanning instruction in an enumeration process.

Case 4: The BIOS runs on another central processing unit other than the first central processing unit 110 and the second central processing unit 111. Optionally, in this case, the other central processing unit configures, by using the BIOS, both the first fabric port 1202 and the second fabric port 1212 to reject a scanning instruction in an enumeration process.

Implementation 2: Configuration is performed by a BMC.

For example, referring to FIG. 7, the BMC generates a configuration instruction, and delivers the configuration instruction to the PCIe switch by using the out-of-band channel. The PCIe switch receives the configuration instruction by using the out-of-band channel, and configures, in response to the configuration instruction of the BMC, the fabric port to reject a scanning instruction. The BMC is configured to configure both the first fabric port 1202 and the second fabric port 1212 to reject a scanning instruction in an enumeration process. In an example, the BMC generates and delivers a configuration instruction to the first PCIe switch 120. The first PCIe switch 120 configures, in response to the configuration instruction of the BMC, the first fabric port 1202 to reject a scanning instruction of the first central processing unit 110 and/or a scanning instruction of the second central processing unit 111. The BMC generates and delivers a configuration instruction to the second PCIe switch 121. The second PCIe switch 121 configures, in response to the configuration instruction of the BMC, the second fabric port 1212 to reject a scanning instruction of the first central processing unit 110 and/or a scanning instruction of the second central processing unit 111.

Implementation 3: Configuration is performed in a firmware manner.

For example, program code indicating the fabric port to reject a scanning instruction in an enumeration process is burnt to firmware of the PCIe switch, to be solidified in the PCIe switch. Each time the system starts, the fabric port rejects a scanning instruction based on the firmware configuration. For example, the first PCIe switch 120 includes the first firmware, and the first firmware is configured to configure the first fabric port 1202 to reject a scanning instruction of the first central processing unit 110 and/or a scanning instruction of the second central processing unit 111 in an enumeration process. The second PCIe switch 121 includes the second firmware, and the second firmware is configured to configure the second fabric port 1212 to reject a scanning instruction of the first central processing unit 110 and/or a scanning instruction of the second central processing unit 111 in an enumeration process.

According to the foregoing configuration method, because the fabric port rejects the scanning instruction, the fabric port and a device connected to the fabric port are hidden from the central processing unit. Because the downstream port and the host port respond to the scanning instruction, the downstream port, a device connected to the downstream port, the host port, and a device connected to the host port are visible to the central processing unit. For example, in the scenario shown in FIG. 4, the first fabric port 1202 and the second PCIe switch 121 connected to the first fabric port 1202 are hidden from the first central processing unit 110. The first downstream port 1203 and the first PCIe device 130 connected to the first downstream port 1203 are visible to the first central processing unit 110. The first host port 1201 is visible to the first central processing unit 110. The second fabric port 1212 and the first PCIe switch 120 connected to the second fabric port 1212 are hidden from the second central processing unit 111. The second downstream port 1213 and the second PCIe device 131 connected to the second downstream port 1213 are visible to the second central processing unit 111. The second host port 1211 is visible to the second central processing unit 111. The feature that the fabric port is hidden from the central processing unit is displayed, for example, through a query result obtained when an operating system queries PCIe information. For example, when the operating system is instructed to query information about all PCIe ports of a PCIe bus and information about all devices connected to the PCIe bus, a query result includes PCIe information of a downstream port, PCIe information of a host port, and information about a PCIe device connected to the downstream port, but does not include PCIe information of a fabric port. The PCIe information includes, for example, a bus number, a device number, and a function number of a corresponding port.

Figure 10:
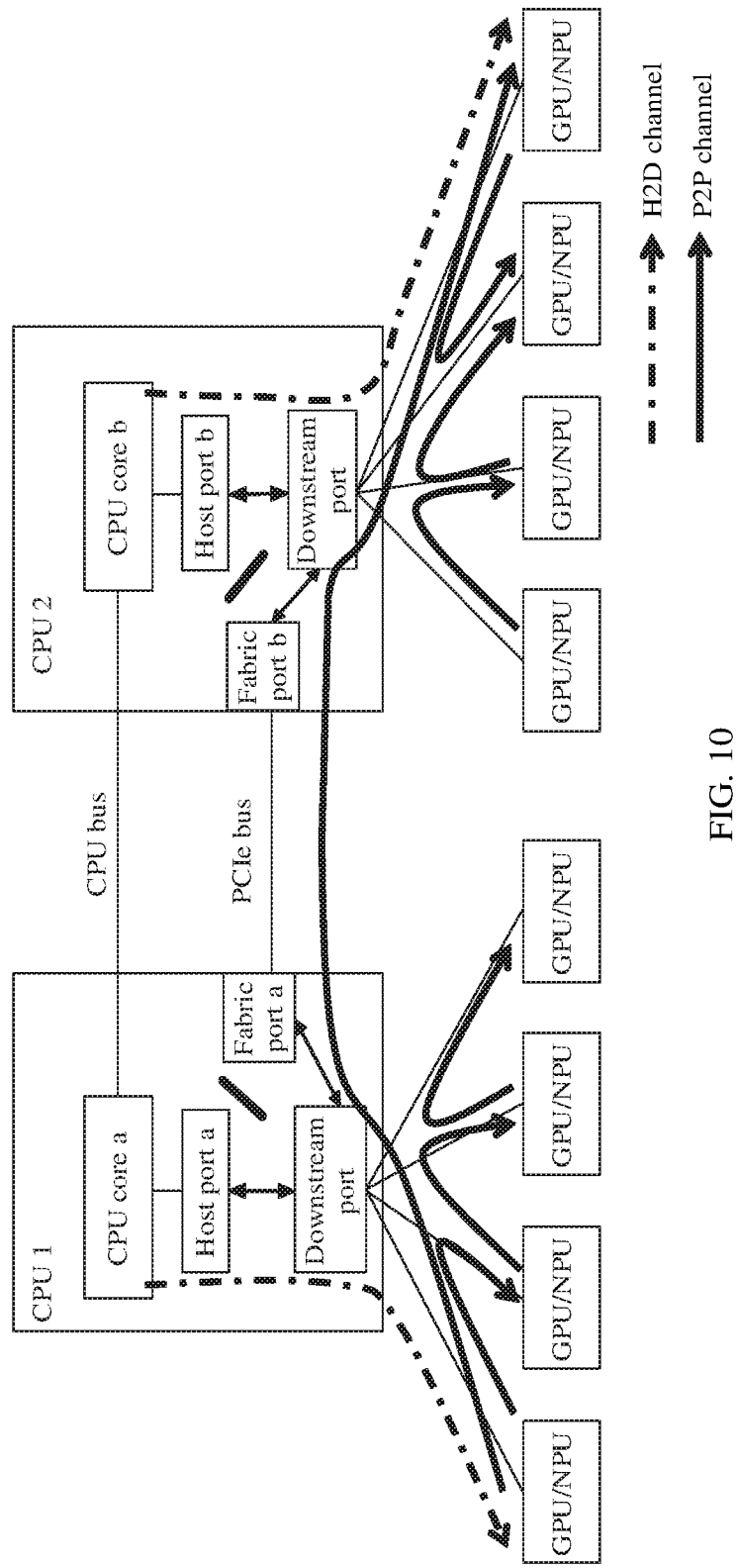
FIG. 10 is a schematic diagram of communication access blocking between a host port and a fabric port according to an embodiment of this application.

Because the fabric port rejects the scanning instruction in the enumeration process, the fabric port is hidden from the central processing unit. In this way, communication between the fabric port and the host port can be blocked. The blocked communication includes communication in a direction from the host port to the fabric port, and also includes communication in a direction from the fabric port to the host port. For example, referring to FIG. 10, for a PCIe topology tree connected to a CPU 1, because a fabric port blocks a scanning instruction from a CPU core a in the CPU 1, communication between the fabric port and a host port is blocked. For a PCIe topology tree connected to a CPU 2, because a fabric port b blocks a scanning instruction from a CPU core b, communication between the fabric port b and a host port b is blocked. It should be noted that "communication is blocked" refers to "communication is logically blocked", and whether the host port and the fabric port are physically connected or not is not limited.

The foregoing configuration method is used for a fabric port of each PCIe switch, so that an access conflict that occurs when PCIe switches of a plurality of CPUs are interconnected can be resolved. The following describes a principle of this technical effect.

In a PCIe enumeration process, because a fabric port rejects a scanning instruction of a CPU, the CPU does not continue to scan, starting from the fabric port, a PCIe switch in another PCIe domain connected to the fabric port, and the CPU does not allocate a bus identity to the fabric port and the PCIe switch in the another PCIe domain. In this way, a bus identity of each PCIe device in each PCIe domain is ensured to be unique. From a perspective of a PCIe topology, a root node corresponding to each PCIe device in each PCIe domain is unique. Therefore, when PCIe switches in different PCIe topology trees are interconnected, it can also be ensured that a plurality of PCIe topology trees connected to a plurality of CPUs are independent of each other, so that an access conflict between different PCIe topology trees does not occur. Independence of the PCIe topology tree means that a path from an end point to an RC is unique. In an example, starting from a PCIe device, a unique CPU is found through level-by-level upward source tracing.

For example, referring to FIG. 4, because the first fabric port 1202 is hidden from the first central processing unit 110, the first central processing unit 110 does not scan the second PCIe switch 121 and the second PCIe device 131 in the second PCIe domain 102 by using the first fabric port 1202 during PCIe enumeration, so that a case in which an RC (the first central processing unit 110) of the first PCIe domain 101 scans the second PCIe switch 121 and the second PCIe device 131 in the second PCIe domain 102 as leaf nodes and allocates bus identities to the second PCIe switch 121 and the second PCIe device 131 is avoided. Because the second fabric port 1212 is hidden from the second central processing unit 111, the second central processing unit 111 does not scan the first PCIe switch 120 and the first PCIe device 130 in the first PCIe domain 101 by using the second fabric port 1212 during PCIe enumeration, so that a case in which an RC (the second central processing unit 111) of the second PCIe domain 102 scans the first PCIe device 130 in the first PCIe domain 101 as a leaf node is avoided. Therefore, RCs of the two PCIe domains, namely, the first PCIe domain 101 and the second PCIe domain 102, do not have a conflict. Each PCIe device in the first PCIe domain 101 has a unique root node (the first central processing unit 110), and each PCIe device in the second PCIe domain 102 has a unique root node (the second central processing unit 111). In other words, when the first PCIe switch 120 and the second PCIe switch 121 are interconnected, the PCIe topology tree connected to the first central processing unit 110 and the PCIe topology tree connected to the second central processing unit 111 are also independent of each other, and no access conflict occurs between the two PCIe topology trees.

The foregoing describes fabric port configuration. The following describes routing information and routing information-related configuration.

Routing information is used to indicate a PCIe switch to perform addressing when the PCIe switch forwards an access request. The routing information is also referred to as a route rule (route rule).

For example, the routing information includes address information of the PCIe device. The address information is used to address a corresponding PCIe device. Address information of the PCIe device is in a plurality of forms. For example, address information of the first PCIe device 130 includes an address window or a bus identity (bus ID) of the first PCIe device 130. For example, referring to FIG. 5 and FIG. 6, a system 300 shown in FIG. 6 and the system 200 shown in FIG. 5 have a similar structure. A difference lies in that the system 200 uses an address window to represent an address of each PCIe device, and the system 300 shows an address of each PCIe device when a bus identity is used to represent the address.

The address window includes at least one address. The address in the address window is, for example, a logical address. Different PCIe devices correspond to different address windows. The address window is used to forward an access request (that is, a P2P access request) between different PCIe devices. In an example, the address in the address window is carried in the access request, and is used as a source address or a destination address of the access request. The PCIe switch can determine, based on the source address in the access request, a specific PCIe device from which the access request comes; and the PCIe switch can determine, based on the destination address in the access request, a specific PCIe device to which the access request needs to be sent, so as to forward the access request. For example, in the scenario shown in FIG. 5, an address window of the NPU 0 is an address window 0 (address window W0), an address window of the NPU 1 is an address window 1 (address window W1), an address window of the NPU 2 is an address window 2 (address window W2), and an address window of the NPU 3 is an address window 3 (address window W3). An address window of the NPU 4 is an address window 4 (address window W4), an address window of the NPU 5 is an address window 5 (address window W5), an address window of the NPU 6 is an address window 6 (address window W6), and an address window of the NPU 7 is an address window 7 (address window W7).

The bus identity is used to identify a PCIe bus connected to the PCIe device. In some embodiments, the bus identity is globally unique. The term "globally unique" means that a PCIe device is in a one-to-one correspondence with a bus identity, and different PCIe devices correspond to different bus identities. For example, in a scenario shown in FIG. 6, a bus identity corresponding to the NPU 0 is a bus 10, indicating that a PCIe bus connected to the NPU 0 is the bus 10. Similarly, a bus identity corresponding to the NPU 1 is a bus 11, a bus identity corresponding to the NPU 2 is a bus 12, and a bus identity corresponding to the NPU 3 is a bus 13. A bus identity corresponding to the NPU 4 is a bus 80, a bus identity corresponding to the NPU 5 is a bus 81, a bus identity corresponding to the NPU 6 is a bus 82, and a bus identity corresponding to the NPU 7 is a bus 83.

Certainly, the address window or the bus identity is an example of the address information, and it is not limited that the address information needs to be the two types of information. For example, the address information may alternatively be a media access control (MAC) address or an Internet Protocol (IP) address of the PCIe device, or other data that can identify an identity of the PCIe device.

Specific hardware in which various types of routing information are stored in the system is not limited in embodiments. For example, manners of storing routing information include the following Case A and Case B.

Case A: All or a part of the routing information is stored in a processing unit of the PCIe switch.

The processing unit of the PCIe switch is, for example, a switch chip. The processing unit is, for example, built in the PCIe switch. The processing unit is configured to control and manage components (such as a downstream port, a fabric port, and a host port) in the PCIe switch. For example, in the scenario shown in FIG. 4, the first PCIe switch includes a first processing unit. The first processing unit is a processing unit of the first PCIe switch. For example, the first processing unit is a switch chip of the first PCIe switch. The second PCIe switch includes a second processing unit. The second processing unit is a processing unit of the second PCIe switch. For example, the second processing unit is a switch chip of the second PCIe switch.

Case B: The various types of routing information are stored in a corresponding port of the PCIe switch.

For example, the port of the PCIe switch has a chip, and the various types of routing information are stored in the chip of the port, so that the routing information is directly configured on the port.

When the address of the PCIe device is represented in different forms, content of the routing information is different. For example, when the address of the PCIe device is represented in a form of an address window, the routing information is referred to as address routing information (that is, address route rule), and the routing information includes an address window of the PCIe device. When the address of the PCIe device is represented in a form of a bus identity, the routing information is referred to as ID routing information (that is, ID route rule), and the routing information includes a bus identity corresponding to the PCIe device.

The following uses (a) to (c) as examples to describe routing information configured on various PCIe ports of the PCIe switch.

(a) Cross-Domain Routing Information Configured on the Fabric Port

The cross-domain routing information is used to route and forward an access request of a local domain to an external domain. In an example, the cross-domain routing information indicates a correspondence between address information of a PCIe device in the external domain and a port identity of a fabric port of a PCIe switch in the external domain. Therefore, the cross-domain routing information can indicate such a path: a processor or a PCIe device in the local domain→a fabric port of a PCIe switch in the local domain→the fabric port of the PCIe switch in the external domain→the PCIe device in the external domain. In this case, when the processor or the PCIe device initiates access to the external domain, because an access request of the local domain can be forwarded to the external domain along such a path, a cross-domain access function is implemented.

The cross-domain routing information is implemented in a plurality of manners. In some embodiments, the cross-domain routing information includes a correspondence between a domain identity of the external domain and the port identity of the fabric port in the external domain, and a correspondence between the address information of the PCIe device in the external domain and the domain identity of the external domain. In some other embodiments, the cross-domain routing information includes the correspondence between the address information of the PCIe device in the external domain and the port identity of the fabric port of the PCIe switch in the external domain.

For example, when the address information is an address window, the cross-domain routing information includes a correspondence between a domain identity and a port identity of a fabric port, and a correspondence between an address window of a PCIe device and an identity of a downstream port.

For another example, when the address information is a bus identity, the cross-domain routing information includes a correspondence between a bus identity corresponding to a PCIe device and a port identity of a fabric port, and a correspondence between the bus identity corresponding to the PCIe device and an identity of a downstream port.

The following uses the scenario of two domains shown in FIG. 4 as an example to describe the cross-domain routing information. For a purpose of distinguishing and describing cross-domain routing information of different domains, cross-domain routing information in the first PCIe domain is referred to as first cross-domain routing information, and cross-domain routing information in the second PCIe domain is referred to as second cross-domain routing information. The first cross-domain routing information is, for example, configured on the first PCIe switch. The second cross-domain routing information is, for example, configured on the second PCIe switch. For example, the first cross-domain routing information is configured on the first fabric port of the first PCIe switch. The second cross-domain routing information is configured on the second fabric port of the second PCIe switch.

In some embodiments, the cross-domain routing information is stored in a processing unit of a PCIe switch. In some other embodiments, the cross-domain routing information is stored in a fabric port (for example, a chip of the fabric port) of a PCIe switch.

(a-1) First Cross-Domain Routing Information

The first cross-domain routing information indicates a correspondence between address information of the second PCIe device 131 and a port identity of the second fabric port. For example, the first cross-domain routing information includes a correspondence between a domain identity of the second PCIe domain and the port identity of the second fabric port, and a correspondence between the address information of the second PCIe device 131 and the domain identity of the second PCIe domain. For another example, the first cross-domain routing information includes the correspondence between the address information of the second PCIe device 131 and the port identity of the second fabric port.

In some embodiments, the first cross-domain routing information is stored in the first processing unit. In some other embodiments, the first cross-domain routing information is stored in the first fabric port (for example, a chip of the first fabric port) of the first PCIe switch.

In some embodiments, the first cross-domain routing information includes a first entry and a third entry.

The first entry includes the correspondence between the domain identity of the second PCIe domain 102 and the port identity of the second fabric port 1212. For example, in the scenario shown in FIG. 5, egress domain 2→fabric port b is configured on the fabric port a (fabric port a) of the PCIe switch 1. egress domain 2→fabric port b is an example of the first entry. domain 2 is an example of a domain identity. fabric port b is an example of a port identity of a fabric port. egress domain 2→fabric port b represents egress direction configuration on the fabric port a. This configuration indicates that an access request for the PCIe domain 2 is forwarded to the fabric port b.

The first entry is configured on the first fabric port 1202. In this way, the first fabric port 1202 can correctly address the second fabric port 1212 based on the first entry when forwarding an access request to an external domain (the second PCIe domain 102). For example, in the scenario shown in FIG. 5, the fabric port a can correctly address the fabric port b when receiving an access request having a domain ID "domain 2", so as to send the access request to the fabric port b. It can be learned that the configuration facilitates cross-domain transmission of the access request between the first PCIe domain 101 and the second PCIe domain 102.

The third entry includes a correspondence between a bus identity corresponding to the second PCIe device 131 and the port identity of the second fabric port 1212. For example, in the scenario shown in FIG. 6, egress 80~83→fabric port b is configured on the fabric port a of the PCIe switch 1. egress 80~83→fabric port b is an example of the third entry. 80~83 is an example of bus identities corresponding to four PCIe devices. fabric port b is an example of a port identity of a fabric port. egress 80~83→fabric port b represents egress direction configuration on the fabric port a. This configuration indicates that an access request having a bus identity of a destination bus that belongs to (80, 83) is forwarded to the fabric port b.

The third entry is configured on the first fabric port 1202. In this way, the first fabric port 1202 can correctly address, when forwarding an access request to an external domain (the second PCIe domain 102), the second fabric port 1212 based on the third entry and a bus identity corresponding to a destination PCIe device (the second PCIe device 131) in the external domain. For example, in the scenario shown in FIG. 5, the fabric port a can correctly address the fabric port b when receiving an access request having a bus ID "80", so as to send the access request to the fabric port b.

(a-2) Second Cross-Domain Routing Information

The second cross-domain routing information indicates a correspondence between address information of the first PCIe device 130 and a port identity of the first fabric port. For example, the second cross-domain routing information includes a correspondence between a domain identity of the first PCIe domain and the port identity of the first fabric port, and a correspondence between the address information of the first PCIe device 130 and the domain identity of the first PCIe domain. For another example, the second cross-domain routing information includes the correspondence between the address information of the first PCIe device 130 and the port identity of the first fabric port.

In some embodiments, the second cross-domain routing information is stored in the second processing unit. In some other embodiments, the second cross-domain routing information is stored in the second fabric port (for example, a chip of the second fabric port) of the second PCIe switch.

Content of the second cross-domain routing information includes a plurality of implementations. For example, the second cross-domain routing information includes a second entry and a fourth entry.

The second entry includes the correspondence between the domain identity of the first PCIe domain 101 and the port identity of the first fabric port 1202. For example, in the scenario shown in FIG. 5, egress domain 1→fabric port a is configured on the fabric port b of the PCIe switch 2. egress domain 1→fabric port a is an example of the second entry. domain 1 is an example of a domain identity. fabric port a is an example of a port identity of a fabric port. egress domain 1→fabric port a represents egress direction configuration on the fabric port b. This configuration indicates that an access request to be sent to the PCIe domain 1 is forwarded to the fabric port a.

The second entry is configured on the second fabric port 1212. In this way, the second fabric port 1212 can address the first fabric port 1202 based on the second entry when forwarding an access request to an external domain (the first PCIe domain 101). For example, in the scenario shown in FIG. 5, the fabric port b can correctly address the fabric port a when receiving an access request having a domain ID "domain 1", so as to send the access request to the fabric port a. It can be learned that the configuration facilitates cross-domain transmission of the access request between the first PCIe domain 101 and the second PCIe domain 102.

The fourth entry includes a correspondence between a bus identity corresponding to the first PCIe device 130 and the port identity of the first fabric port 1202. For example, in the scenario shown in FIG. 6, egress 10~13→fabric port a is configured on the fabric port b of the PCIe switch 2. egress 10~13→fabric port a is an example of the fourth entry. 10~13 is an example of bus identities corresponding to four PCIe devices. fabric port a is an example of a port identity of a fabric port. egress 10~13→fabric port a represents egress direction configuration on the fabric port b. This configuration indicates that an access request having a bus identity of a destination bus that belongs to (10, 13) is forwarded to the fabric port a.

The fourth entry is configured on the second fabric port 1212. In this way, the second fabric port 1212 can address, when forwarding an access request to an external domain (the first PCIe domain 101), the first fabric port 1202 based on the fourth entry and a bus identity corresponding to a destination PCIe device (the first PCIe device 130) in the external domain. For example, in the scenario shown in FIG. 5, the fabric port b can correctly address the fabric port a when receiving an access request having a bus ID "10", so as to send the access request to the fabric port a. It can be learned that the configuration facilitates cross-domain transmission of the access request between the first PCIe domain 101 and the second PCIe domain 102.

(b) Local Domain Routing Information Configured on the Fabric Port

The local domain routing information is used to route and forward an access request from an external domain to a local domain. In an example, the local domain routing information includes a correspondence between address information of a PCIe device in the local domain and a port identity of a downstream port of a PCIe switch in the local domain. Therefore, the local domain routing information can indicate such a path: a processor or a PCIe device in the external domain→a fabric port of a PCIe switch in the local domain→the downstream port of the PCIe switch in the local domain→the PCIe device in the local domain. In this case, when the processor or the PCIe device in the external domain initiates access to the local domain, because an access request of the external domain can be forwarded to the local domain along such a path, a cross-domain access function is implemented.

In some embodiments, the local domain routing information is stored in a processing unit of a PCIe switch. In some other embodiments, the local domain routing information is stored in a fabric port (for example, a chip of the fabric port) of a PCIe switch.

The following uses the scenario of two domains shown in FIG. 4 as an example to describe the local domain routing information. For a purpose of distinguishing and describing local domain routing information of different domains, local domain routing information in the first PCIe domain is referred to as first local domain routing information, and local domain routing information in the second PCIe domain is referred to as second local domain routing information. The first local domain routing information is, for example, configured on the first PCIe switch. The second local domain routing information is, for example, configured on the second PCIe switch. For example, the first local domain routing information is configured on the first fabric port of the first PCIe switch. The second local domain routing information is configured on the second fabric port of the second PCIe switch.

(b-1) First Local Domain Routing Information

The first local domain routing information includes a correspondence between address information of the first PCIe device 130 and a port identity of the first downstream port 1203. For example, the first local domain routing information includes a fifth entry and a seventh entry.

In some embodiments, the first local domain routing information is stored in the first processing unit. In some other embodiments, the first local domain routing information is stored in the first fabric port 1202 (for example, a chip of the first fabric port) of the first PCIe switch.

The fifth entry includes a correspondence between an address window of the first PCIe device 130 and the port identity of the first downstream port (DP) 1203.

ingress window w0~w3→DP0~3 is an example of the fifth entry. window w0 is an example of an address window. DP0~3 is an example of identities of four downstream ports. ingress window w0~w3→DP0~3 represents ingress direction configuration on the fabric port a. This configuration indicates that an access request whose destination address belongs to window w0~w3 is forwarded to a corresponding downstream port in the DPs 0~3.

The fifth entry is configured on the first fabric port 1202. In this way, when the first fabric port 1202 receives an access request sent from an external domain (the second PCIe domain 102) to a destination PCIe device (the first PCIe device 130) in a local domain, the first fabric port 1202 can correctly address, based on the fifth entry, a downstream port (the first downstream port 1203) connected to the destination PCIe device. For example, in the scenario shown in FIG. 5, the fabric port a can correctly address the DP 0 when receiving an access request whose destination address belongs to "window w0", so that the access request is sent to the DP 0 of the PCIe switch 1, and is not incorrectly sent to the DP 1 of the PCIe switch 1. It can be learned that the configuration facilitates cross-domain transmission of the access request between the first PCIe domain 101 and the second PCIe domain 102.

The seventh entry includes a correspondence between a bus identity corresponding to the first PCIe device 130 and the port identity of the first downstream port 1203.

Figure 6:
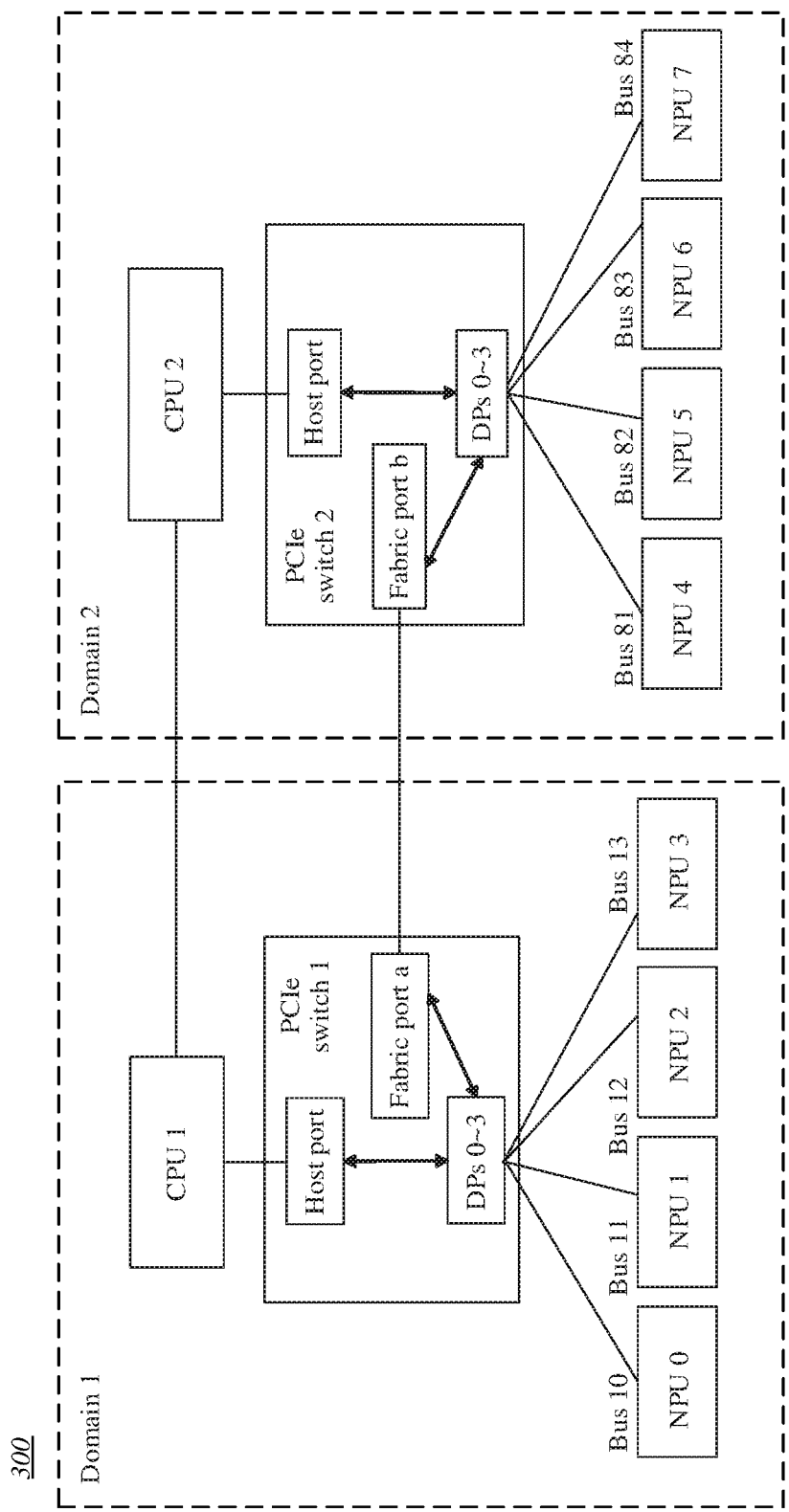
FIG. 6 is a schematic diagram of an architecture of a multiprocessor system according to an embodiment of this application.

For example, in the scenario shown in FIG. 6, ingress 10~13→DP0~3 is configured on the fabric port a (fabric port a) of the PCIe switch 1. ingress 10~13→DP0~3 is an example of the seventh entry. 10~13 is an example of bus identities corresponding to four PCIe devices. DP0~3 is an example of identities of four downstream ports. ingress 10~13→DP0~3 represents ingress direction configuration on the fabric port a (fabric port a). This configuration indicates that an access request having a bus identity of a destination address that belongs to (10, 13) is forwarded to a corresponding downstream port in the DPs 0~3.

The seventh entry is configured on the first fabric port 1202. In this way, when the first fabric port 1202 receives an access request sent from an external domain (the second PCIe domain 102) to a destination PCIe device (the first PCIe device 130) in a local domain, the first fabric port 1202 can correctly address, based on the seventh entry, a downstream port (the first downstream port 1203) connected to the destination PCIe device. For example, in the scenario shown in FIG. 5, the fabric port a can correctly address the DP 0 when receiving an access request whose destination address belongs to "10", so that the access request is sent to the DP 0 of the PCIe switch 1, and is not incorrectly sent to the DP 1 of the PCIe switch 1. It can be learned that the configuration facilitates cross-domain transmission of the access request between the first PCIe domain 101 and the second PCIe domain 102.

(b-2) Second Local Domain Routing Information

The second local domain routing information includes a correspondence between address information of the second PCIe device 131 and a port identity of the second downstream port 1213. In some embodiments, the second local domain routing information is stored in the second processing unit. In some other embodiments, the second local domain routing information is stored in the second fabric port (for example, a chip of the second fabric port) of the second PCIe switch.

For example, the second local domain routing information includes a sixth entry and an eighth entry.

The sixth entry includes a correspondence between an address window of the second PCIe device 131 and the port identity of the second downstream port 1213.

ingress window w4~w7→DP0~3 is an example of the sixth entry. window w4~w7 is an example of four address windows. DP0~3 is an example of identities of four downstream ports. ingress window w4~w7→DP0~3 represents ingress direction configuration on the fabric port b (fabric port b). This configuration indicates that an access request whose destination address belongs to window w4~w7 is forwarded to a corresponding downstream port in the DPs 0~3.

The sixth entry is configured on the second fabric port 1212. In this way, when the second fabric port 1212 receives an access request sent from an external domain (the first PCIe domain 101) to a destination PCIe device (the second PCIe device 131) in a local domain, the second fabric port 1212 can correctly address, based on the sixth entry, a downstream port (the second downstream port 1213) connected to the destination PCIe device.

The eighth entry includes a correspondence between a bus identity corresponding to the second PCIe device 131 and the port identity of the second downstream port 1213.

ingress 80~83→DP0~3 is an example of the eighth entry. 80~83 is an example of bus identities corresponding to four PCIe devices. DP0~3 is an example of identities of four downstream ports. ingress 80~83→DP0~3 represents ingress direction configuration on the fabric port b (fabric port b). This configuration indicates that an access request having a bus identity of a destination address that belongs to (80, 83) is forwarded to a corresponding downstream port in the DPs 0~3.

The eighth entry is configured on the second fabric port 1212. In this way, when the second fabric port 1212 receives an access request sent from an external domain (the first PCIe domain 101) to a destination PCIe device (the second PCIe device 131) in a local domain, the second fabric port 1212 can correctly address, based on the eighth entry, a downstream port (the second downstream port 1213) connected to the destination PCIe device.

With reference to the foregoing cross-domain routing information and local domain routing information, for example, in the scenario shown in FIG. 5, egress domain 2→fabric port b and ingress window w0~w3→DP0~3 are configured on the fabric port a of the PCIe switch 1. egress domain 1→fabric port a and ingress window w4~w7→DP0~3 are configured on the fabric port b of the PCIe switch 2. For another example, in the scenario shown in FIG. 6, egress 80~83→fabric port b and ingress 10~13→DP0~3 are configured on the fabric port a of the PCIe switch 1. egress 10~13→fabric port a and ingress 80~83→DP0~3 are configured on the fabric port b of the PCIe switch 2.

(c) Downstream Port Routing Information Configured on the Downstream Port

The downstream port routing information is used to route and forward an access request whose destination domain is an external domain to a corresponding fabric port.

For example, the downstream port routing information indicates a correspondence between address information of a PCIe device in an external domain and a port identity of a fabric port in a local domain. Therefore, the downstream port routing information can indicate such a path: a downstream port of a PCIe device in the local domain→a fabric port of a PCIe switch in the local domain→a PCIe switch in the external domain→the PCIe device in the external domain. In this case, when a processor or the PCIe device initiates access to the external domain, because an access request of the local domain can be forwarded from a proper fabric port in the local domain along such a path, the access request can reach the correct external domain, and a cross-domain access function is implemented.

In some embodiments, the downstream port routing information is stored in a processing unit of a PCIe switch. In some other embodiments, the downstream port routing information is stored in a downstream port (for example, a chip of the downstream port) of a PCIe switch.

The downstream port routing information is implemented in a plurality of manners. In some embodiments, the downstream port routing information includes a correspondence between a domain identity of the external domain and the port identity of the fabric port in the local domain, and a correspondence between the address information of the PCIe device in the external domain and the domain identity of the external domain. In some other embodiments, the downstream port routing information includes the correspondence between the address information of the PCIe device in the external domain and the port identity of the fabric port in the local domain.

The downstream port routing information is, for example, in a form of an address mapping table that is also referred to as a DP port address mapping table.

The following uses the scenario of two domains shown in FIG. 4 as an example to describe the downstream port routing information. For a purpose of distinguishing and describing downstream port routing information of different domains, downstream port routing information in the first PCIe domain 101 is referred to as first downstream port routing information, and downstream port routing information in the second PCIe domain is referred to as second downstream port routing information. The first downstream port routing information is, for example, configured on the first PCIe switch 120. The second downstream port routing information is, for example, configured on the second PCIe switch 121. For example, the first downstream port routing information is configured on the first downstream port 1203 of the first PCIe switch 120. The second downstream port routing information is configured on the second downstream port 1213 of the second PCIe switch 121.

(c-1) First Downstream Port Routing Information

The first downstream port routing information indicates a correspondence between address information of the second PCIe device 131 and a port identity of the first fabric port 1202. In some embodiments, the first downstream port routing information is stored in the first processing unit. In some other embodiments, the first downstream port routing information is stored in the first downstream port (for example, a chip of the first downstream port) of the first PCIe switch.

The first downstream port routing information includes a relationship (for example, the following ninth entry) between a domain identity of the second PCIe domain 102 and the port identity of the first fabric port 1202, and a correspondence (for example, the following eleventh entry or thirteenth entry) between the address information of the second PCIe device 131 and the domain identity of the second PCIe domain 102.

The ninth entry includes the correspondence between the domain identity of the second PCIe domain 102 and the port identity of the first fabric port 1202. egress domain 2→fabric port a is an example of the ninth entry. domain 2 is an example of a domain identity. fabric port a is an example of a port identity of a fabric port. egress domain 2→fabric port a represents egress direction configuration on the downstream port. This configuration indicates that an access request for the PCIe domain 2 is forwarded to the fabric port a.

The ninth entry is configured on the first downstream port 1203. In this way, when the first downstream port 1203 receives an access request whose destination domain is an external domain (the second PCIe domain 102), the first downstream port 1203 can correctly address the first fabric port 1202 based on the ninth entry. For example, in the scenario shown in FIG. 5, when the downstream port DP 0 receives, from the NPU 0, an access request having a domain ID "domain 2", the downstream port DP 0 correctly addresses the fabric port a, the downstream port DP 0 sends the access request to the fabric port a, and the fabric port a sends the access request to the fabric port b. In this way, the access request of the local domain is forwarded to the external domain in an across-domain manner. It can be learned that the configuration enables the downstream port to correctly address the corresponding fabric port, and facilitates cross-domain transmission of the access request between the first PCIe domain 101 and the second PCIe domain 102.

The eleventh entry includes a correspondence between an address window of the second PCIe device 131 and the domain identity of the second PCIe domain 102. For example, the eleventh entry is configured on the downstream ports (DP 0 to DP 3) of the PCIe switch 1 shown in FIG. 5. The eleventh entry includes, for example, a correspondence between address window w4 and egress domain 2, a correspondence between address window w5 and egress domain 2, a correspondence between address window w6 and egress domain 2, and a correspondence between address window w7 and egress domain 2. The eleventh entry is configured on the first downstream port. In this way, the PCIe switch 1 can find, based on an address window of the PCIe device in the external domain, that a PCIe domain to which an access request is to be sent is the PCIe domain 2.

The thirteenth entry includes a correspondence between a bus identity corresponding to the second PCIe device 131 and the port identity of the first fabric port 1202. egress 80~83→fabric port a is an example of the thirteenth entry. 80~83 is an example of an interval to which a bus identity of a device in the PCIe domain 2 belongs. fabric port a is an example of a port identity of a fabric port. egress 80~83→fabric port a represents ingress direction configuration on the downstream port. This configuration indicates that an access request having a bus identity of a destination bus that belongs to (80, 83) is forwarded to the fabric port a.

(c-2) Second Downstream Port Routing Information

The second downstream port routing information indicates a correspondence between address information of the first PCIe device 130 and a port identity of the second fabric port. In some embodiments, the second downstream port routing information is stored in the second processing unit. In some other embodiments, the second downstream port routing information is stored in the second downstream port (for example, a chip of the second downstream port) of the second PCIe switch 121.

The second downstream port routing information includes a relationship (for example, the following tenth entry) between a domain identity of the first PCIe domain and the port identity of the second fabric port, and a correspondence (for example, the following twelfth entry or fourteenth entry) between the address information of the first PCIe device 130 and a domain identity of the first PCIe domain.

The tenth entry includes the correspondence between the domain identity of the first PCIe domain 101 and the port identity of the second fabric port 1212. egress domain 1→fabric port b is an example of the tenth entry. domain 2 is an example of a domain identity. fabric port b is an example of a port identity of a fabric port. egress domain 1→fabric port b represents egress direction configuration on the second downstream port. This configuration indicates that an access request to be sent to the PCIe domain 2 is forwarded to the fabric port b (fabric port b). The tenth entry is configured on the second downstream port 1213. In this way, when the second downstream port 1213 receives an access request whose destination domain is an external domain (the first PCIe domain 101), the second downstream port 1213 can correctly address the second fabric port 1212 based on the tenth entry.

The twelfth entry includes a correspondence between an address window of the first PCIe device 130 and the domain identity of the first PCIe domain 101. For example, the twelfth entry is configured on the downstream ports (DP 0 to DP 3) of the PCIe switch 2 shown in FIG. 5. The twelfth entry includes, for example, a correspondence between address window w1 and egress domain 1, a correspondence between address window w2 and egress domain 1, a correspondence between address window w3 and egress domain 1, and a correspondence between address window w4 and egress domain 1. The twelfth entry is configured on the second downstream port. In this way, the PCIe switch 2 can find, based on an address window of the PCIe device in the external domain, that a PCIe domain to which an access request is to be sent is the PCIe domain 1.

egress 10~13→fabric port b is an example of the fourteenth entry. 10~13 is an example of an interval to which a bus identity of a device in the PCIe domain 1 belongs. fabric port b is an example of a port identity of a fabric port. egress 10~13→fabric port b represents ingress direction configuration on the downstream port. This configuration indicates that an access request having a bus identity of a destination bus that belongs to (10, 13) is forwarded to the fabric port b (fabric port b).

The foregoing describes some routing information and entries in the routing information that are related to cross-domain access. In embodiments, it is not limited that only the routing information listed above is configured on a downstream port or a fabric port. Optionally, other routing information is further configured on the downstream port or the fabric port, to further improve communication reliability. With reference to the scenario shown in FIG. 4 and the scenario shown in FIG. 5, the following describes, by using examples, some routing information that may be further configured on the downstream port or the fabric port.

For example, referring to FIG. 4, in the system 100, a thirteenth entry, a fifteenth entry, and a seventeenth entry are configured on the first downstream port 1203, and a fourteenth entry, a sixteenth entry, and an eighteenth entry are configured on the second downstream port 1213. For example, referring to FIG. 5, in the system having two CPUs and eight NPUs, address entries of a downstream port of the PCIe switch 1 include egress domain 2→fabric port a, ingress window w0~NPU0, ingress window w1~NPU1, ingress window w2~NPU2, and ingress window w3→NPU3. Address entries of a downstream port of the PCIe switch 2 include egress domain 1→fabric port b, ingress window w4~NPU4, ingress window w5~NPU5, ingress window w6~NPU6, and ingress window w7→NPU7. For another example, referring to FIG. 6, in the scenario, ID routing information of the downstream port of the PCIe switch 1 includes egress 80~83→fabric port a, ingress 10→NPU0, ingress 11~NPU1, ingress 12~NPU2, and ingress 13→NPU3. ID routing information of the downstream port of the PCIe switch 2 includes egress 10~13→fabric port b, ingress 80~NPU4, ingress 81~NPU5, ingress 82~NPU6, and ingress 83→NPU7.

The fourteenth entry includes a correspondence between a bus identity corresponding to the first PCIe device 130 and a port identity of the second fabric port 1212.

The fifteenth entry includes a correspondence between an address window of the first PCIe device 130 and an identity of the first PCIe device 130.

ingress window w1→NPU1 is an example of the fifteenth entry. window w1 is an example of an address window. NPU1 is an example of an identity of a PCIe device. ingress window w1→NPU1 represents ingress direction configuration on a downstream port. This configuration indicates that an access request whose destination address belongs to the address window w1 (address window w1) is forwarded to the NPU 1.

ingress window w2→NPU2 is an example of the fifteenth entry. window w2 is an example of an address window. NPU2 is an example of an identity of a PCIe device. ingress window w2→NPU2 represents ingress direction configuration on a downstream port. This configuration indicates that an access request whose destination address belongs to the address window w2 (address window w2) is forwarded to the NPU 2.

ingress window w3→NPU3 is an example of the fifteenth entry. window w3 is an example of an address window. NPU3 is an example of an identity of a PCIe device. ingress window w3→NPU3 represents ingress direction configuration on a downstream port. This configuration indicates that an access request whose destination address belongs to the address window w3 (address window w3) is forwarded to the NPU 3.

The sixteenth entry includes a correspondence between an address window of the second PCIe device 131 and an identity of the second PCIe device 131.

ingress window w4→NPU4 is an example of the sixteenth entry. window w4 is an example of an address window. NPU4 is an example of an identity of a PCIe device. ingress window w4→NPU4 represents ingress direction configuration on a downstream port. This configuration indicates that an access request whose destination address belongs to the address window w4 (address window w4) is forwarded to the NPU 4.

ingress window w5→NPU5 is an example of the sixteenth entry. window w5 is an example of an address window. NPU5 is an example of an identity of a PCIe device. ingress window w5→NPU5 represents ingress direction configuration on a downstream port. This configuration indicates that an access request whose destination address belongs to the address window w5 (address window w5) is forwarded to the NPU 5.

ingress window w6→NPU6 is an example of the sixteenth entry. window w6 is an example of an address window. NPU6 is an example of an identity of a PCIe device. ingress window w6→NPU6 represents ingress direction configuration on a downstream port. This configuration indicates that an access request whose destination address belongs to the address window w6 (address window w6) is forwarded to the NPU 6.

ingress window w7→NPU7 is an example of the sixteenth entry. window w7 is an example of an address window. NPU7 is an example of an identity of a PCIe device. ingress window w7→NPU7 represents ingress direction configuration on a downstream port. This configuration indicates that an access request whose destination address belongs to the address window w7 (address window w7) is forwarded to the NPU 7.

The seventeenth entry includes a correspondence between a bus identity corresponding to the first PCIe device 130 and an identity of the first PCIe device 130.

ingress 10→NPU0 is an example of the seventeenth entry. 10 is an example of a bus identity. NPU0 is an example of an identity of a PCIe device. ingress 10→NPU0 represents ingress direction configuration. This configuration indicates that an access request whose destination bus is the bus 10 is forwarded to the NPU 0.

ingress 11→NPU1 is an example of the seventeenth entry. 11 is an example of a bus identity. NPU1 is an example of an identity of a PCIe device. ingress 11→NPU1 represents ingress direction configuration. This configuration indicates that an access request whose destination bus is the bus 11 is forwarded to the NPU 1.

ingress 12→NPU2 is an example of the seventeenth entry. 12 is an example of a bus identity. NPU2 is an example of an identity of a PCIe device. ingress 12→NPU2 represents ingress direction configuration. This configuration indicates that an access request whose destination bus is the bus 12 is forwarded to the NPU 2.

ingress 13→NPU3 is an example of the seventeenth entry. 13 is an example of a bus identity. NPU3 is an example of an identity of a PCIe device. ingress 13→NPU3 represents ingress direction configuration. This configuration indicates that an access request whose destination bus is the bus 13 is forwarded to the NPU 3.

The eighteenth entry includes a correspondence between a bus identity corresponding to the second PCIe device 131 and an identity of the second PCIe device 131.

ingress 80→NPU4 is an example of the eighteenth entry. 80 is an example of a bus identity. NPU4 is an example of an identity of a PCIe device. ingress 80→NPU4 represents ingress direction configuration. This configuration indicates that an access request whose destination bus is the bus 80 is forwarded to the NPU 4.

ingress 81→NPU5 is an example of the eighteenth entry. 81 is an example of a bus identity. NPU5 is an example of an identity of a PCIe device. ingress 81→NPU5 represents ingress direction configuration. This configuration indicates that an access request whose destination bus is the bus 81 is forwarded to the NPU 5.

ingress 82→NPU6 is an example of the eighteenth entry. 82 is an example of a bus identity. NPU6 is an example of an identity of a PCIe device. ingress 82→NPU6 represents ingress direction configuration. This configuration indicates that an access request whose destination bus is the bus 82 is forwarded to the NPU 6.

ingress 83→NPU7 is an example of the eighteenth entry. 83 is an example of a bus identity. NPU7 is an example of an identity of a PCIe device. ingress 83→NPU7 represents ingress direction configuration. This configuration indicates that an access request whose destination bus is the bus 83 is forwarded to the NPU 7.

The foregoing describes various types of routing information that may be configured on a PCIe port. The following describes a method procedure for configuring the foregoing described routing information on a PCIe port of a PCIe switch.

An occasion for configuring routing information for the PCIe port is not limited in embodiments. In some embodiments, the step of configuring the routing information for the PCIe port is performed after a system is powered on and before a task is started. For example, the step of configuring the routing information is performed during system initialization. For example, in an AI training scenario, before an AI training task is started, the step of configuring the routing information is performed, so that in a process of performing AI training, pre-configured routing information is applied to forward cross-domain P2P access requests of different AI training cards.

An execution body for configuring the routing information for the PCIe port is not limited in embodiments. In some embodiments, a BIOS is responsible for configuring the routing information for the PCIe port of the PCIe switch. For example, in the scenario shown in FIG. 4, the BIOS configures at least one of first cross-domain routing information or first local domain routing information for the first fabric port 1202. The BIOS configures first downstream port routing information for the first downstream port 1203. The BIOS configures second downstream port routing information for the second downstream port 1213.

In some embodiments, an action of configuring routing information (for example, at least one of cross-domain routing information or local domain routing information) by the BIOS for a fabric port is implemented by interacting with a management port of the PCIe switch. For example, referring to FIG. 7, a BIOS running on a CPU generates a configuration instruction, and delivers the configuration instruction to a management port. The configuration instruction includes routing information. A PCIe switch receives the configuration instruction by using the management port. The PCIe switch obtains the routing information from the configuration instruction and configures the routing information for a fabric port. In some embodiments, the action of configuring the routing information for the fabric port is implemented by accessing a register of the fabric port. For example, the management port sends the configuration instruction to firmware of the PCIe switch, the firmware of the PCIe switch obtains the routing information from the configuration instruction, and writes the routing information into the register of the fabric port. The register of the fabric port stores the routing information. When receiving an access request, the fabric port reads the routing information from the register and forwards the access request based on the routing information.

It should be noted that, when the BIOS configures the routing information, a specific CPU that configures the routing information by running the BIOS is not limited in embodiments. In the example of the system architecture shown in FIG. 4, a CPU that configures routing information for a PCIe port includes but is not limited to the following Case A to Case D.

Case A: The BIOS includes a plurality of threads, and different threads of the BIOS run on different central processing units. Optionally, in this case, different central processing units configure routing information on different PCIe ports by using different threads of the BIOS. For example, the BIOS includes a first thread and a second thread, the first thread runs on the first central processing unit 110, and the second thread runs on the second central processing unit 111. Optionally, in this case, the first central processing unit 110 separately configures corresponding routing information for the first fabric port 1202 and the first downstream port 1203 by using the first thread, and the second central processing unit 111 separately configures corresponding routing information for the second fabric port 1212 and the second downstream port 1213 by using the second thread.

Case B: The BIOS runs on the first central processing unit 110. Optionally, in this case, the first central processing unit 110 separately configures corresponding routing information for the first fabric port 1202, the first downstream port 1203, the second fabric port 1212, and the second downstream port 1213 by using the BIOS.

Case C: The BIOS runs on the second central processing unit 111. Optionally, in this case, the second central processing unit 111 separately configures corresponding routing information for the first fabric port 1202, the first downstream port 1203, the second fabric port 1212, and the second downstream port 1213 by using the BIOS.

Case D: The BIOS runs on another central processing unit other than the first central processing unit 110 and the second central processing unit 111. Optionally, in this case, the other central processing unit separately configures corresponding routing information for the first fabric port 1202, the first downstream port 1203, the second fabric port 1212, and the second downstream port 1213 by using the BIOS.

It should be noted that a case in which the first central processing unit 110 configures the first fabric port 1202 is used as an example for description. When the first PCIe switch 120 has a plurality of fabric ports, the first central processing unit 110, for example, configures corresponding routing information for each fabric port of the first PCIe switch 120. In this way, each fabric port can perform forwarding to a correct fabric port in another PCIe domain in an egress direction. Each fabric port can perform forwarding to a correct downstream port in an ingress direction. A step of configuring another fabric port by the first central processing unit 110 is similar to the step of configuring the first fabric port 1202.

It should be noted that a case in which the first central processing unit 110 configures the first downstream port 1203 is used as an example for description. When the first PCIe switch 120 has a plurality of downstream ports, the first central processing unit 110, for example, configures corresponding routing information for each downstream port of the first PCIe switch 120. In this way, each downstream port can perform forwarding to a correct fabric port in an egress direction. Each downstream port can perform forwarding to a correct PCIe device in an ingress direction. A step of configuring another downstream port by the first central processing unit 110 is similar to the step of configuring the first downstream port 1203.

In some embodiments, the routing information is performed by an address mapper run by a central processing unit. For example, a configuration step includes: The address mapper obtains a domain identity of each PCIe domain in a multiprocessor system and a base address register (BAR) space address of a PCIe device in each PCIe domain, and stores a correspondence between the BAR space address of the PCIe device and the domain identity into an address window mapping table. Then, the address mapper identifies a P2P access relationship between PCIe devices, and configures, into a downstream port and a fabric port, a mapping relationship between address windows of each pair of PCIe devices that need to access each other.

The BAR space address is, for example, a device space access address allocated by the BIOS according to a PCIe protocol after the BIOS completes PCIe device scanning. The BAR space address is, for example, a memory-mapped I/O (MMIO) address. The address window mapping table is cached in, for example, a CPU memory.

The P2P access relationship is determined, for example, according to a service requirement. For example, in an AI training scenario, a system has 20 AI training cards, a training task A needs to use eight AI training cards, and a training task B needs to use 12 AI training cards. In this case, a P2P access relationship is established for the eight AI training cards, and a P2P access relationship is established for the 12 AI training cards. In addition, optionally, no P2P access relationship is established between the eight AI training cards corresponding to the training task A and the 12 AI training cards corresponding to the training task B.

An action of configuring a port is implemented, for example, by writing to a register. For example, each PCIe port has a corresponding configuration register, and the mapping relationship between the address windows is written to the configuration register, so that the configuration register stores the mapping relationship between the address windows. In this way, port configuration is implemented.

The routing information configured on each PCIe port of the PCIe switch is described above. With reference to FIG. 4, the following describes a procedure in which the PCIe switch enables a P2P access channel by using the configured routing information in a cross-domain P2P access procedure.

Referring to FIG. 4, a procedure in which the first PCIe switch 120 implements cross-domain P2P access is described by using an example of a scenario in which the first PCIe device 130 and the second PCIe device 131 perform P2P access. Cross-domain P2P access includes a processing procedure in an egress direction and a processing procedure in an ingress direction. The following uses scenario 1 as an example to describe how the first PCIe switch 120 performs a processing procedure in an egress direction, and uses scenario 2 as an example to describe how the first PCIe switch 120 performs a processing procedure in an ingress direction. The first PCIe device 130 and the second PCIe device 131 belong to different PCIe domains, and the first PCIe device 130 belongs to the first PCIe domain 101. The first PCIe device 130 is connected to the first downstream port 1203 of the first PCIe switch 120. The second PCIe device 131 belongs to the second PCIe domain 102. The second PCIe device 131 is connected to the second downstream port 1213 of the second PCIe switch 121.

Scenario 1: The first PCIe device 130 accesses the second PCIe device 131.

In an example, the first PCIe device 130 generates a first access request, and sends the first access request to the first PCIe switch 120. A source PCIe device of the first access request is the first PCIe device 130, and a destination PCIe device of the first access request is the second PCIe device 131 in the second PCIe domain 102. After the first PCIe switch 120 receives the first access request, a task of the first PCIe switch 120 is to send the first access request from the first PCIe domain 101 to the second PCIe domain 102, that is, perform routing and forwarding in an egress direction.

In some embodiments, a PCIe switch performs an action of adding a domain identity of another PCIe domain to an access request. For example, after the first PCIe switch 120 receives the first access request by using the first downstream port 1203, the first PCIe switch 120 determines a domain identity of the second PCIe domain 102 based on the first access request and routing information configured on the first downstream port 1203. The first PCIe switch 120 adds the domain identity of the second PCIe domain 102 to the first access request. The first PCIe switch 120 sends, to the second fabric port 1212 by using the first fabric port 1202, the first access request including the domain identity.

In an example, the routing information configured on the first downstream port 1203 includes a correspondence between an address window and a domain identity. The first PCIe switch 120 determines a destination address of the first access request, compares the destination address with each address window in the routing information configured on the first downstream port 1203, and determines a domain identity corresponding to an address window to which the destination address belongs. If the determined domain identity is the domain identity of the second PCIe domain 102, it is indicated that the destination address of the access request is mapped to another domain, the first PCIe switch 120 adds the domain identity of the second PCIe domain 102 to a header of the destination address, so that the first access request includes the domain identity. Then, the first downstream port 1203 sends the first access request including the domain identity to the first fabric port 1202.

According to the foregoing method, when receiving an access request for a PCIe device in another PCIe domain, the PCIe switch adds a domain identity of the another PCIe domain to the access request, so that a fabric port can quickly match, based on the added domain identity, whether the access request needs to access a PCIe device in a local domain. This simplifies a table lookup action.

In some embodiments, in a cross-domain P2P access process, a downstream port addresses a corresponding fabric port based on configured routing information. The following uses Implementation A as an example to describe how a downstream port addresses a fabric port during addressing based on an address window, and uses Implementation B as an example to describe how a downstream port addresses a fabric port during addressing based on a bus identity.

Implementation A: After the first PCIe switch 120 receives the first access request by using the first downstream port 1203, the first PCIe switch 120 determines the first fabric port 1202 based on the first access request and a ninth entry configured on the first downstream port 1203. Then, the first downstream port 1203 sends the first access request to the determined first fabric port 1202.

The ninth entry corresponds to downstream port routing information. The ninth entry includes a correspondence between a domain identity of the second PCIe domain 102 and a port identity of the first fabric port 1202. The first PCIe switch 120 queries the ninth entry based on the domain identity to obtain the port identity of the first fabric port 1202, and determines the first fabric port 1202 based on the port identity of the first fabric port 1202.

For example, in the scenario shown in FIG. 5, egress domain 2→fabric port a is configured on a downstream port. The first PCIe switch 120 queries the configuration based on a domain identity domain 2 to obtain a port identity fabric port a, and determines that a fabric port a identified by fabric port a is a fabric port connected to the domain 2. Then, the downstream port sends a first access request to the fabric port a. In this example, egress domain 2→fabric port a is the ninth entry configured on the first downstream port 1203.

Because the ninth entry is configured on the first downstream port 1203, the first downstream port 1203 can send, to the first fabric port 1202 based on the ninth entry, the access request to be sent to the second PCIe domain 102. This helps send the access request from the first fabric port 1202 to the second PCIe domain 102, and implements PCIe cross-domain address mapping.

In some embodiments, a domain identity of another PCIe domain is found based on an entry configured on a downstream port. For example, an eleventh entry is configured on the first downstream port 1203, and the first PCIe switch 120 determines the domain identity of the second PCIe domain 102 based on the first access request and the eleventh entry.

The eleventh entry corresponds to downstream port routing information. The eleventh entry includes a correspondence between an address window of the second PCIe device 131 and the domain identity of the second PCIe domain 102. The eleventh entry is an example of a correspondence between an address window and a domain identity that are of an external domain. The first PCIe switch 120 queries the eleventh entry based on a destination address in the first access request. In a process of querying the eleventh entry, the first PCIe switch 120 matches the destination address with an address window of each PCIe device. When an address window of the second PCIe device 131 is matched, because the address window of the second PCIe device 131 corresponds to the domain identity of the second PCIe domain 102, it is determined that a domain identity to be added is the domain identity of the second PCIe domain 102.

Implementation B: After the first PCIe switch 120 receives the first access request by using the first downstream port 1203, the first PCIe switch 120 determines the first fabric port 1202 based on the first access request and a thirteenth entry configured on the first downstream port 1203. Then, the first downstream port 1203 sends the first access request to the determined first fabric port 1202.

The thirteenth entry corresponds to downstream port routing information. The thirteenth entry includes a correspondence between a bus identity corresponding to the second PCIe device 131 and a port identity of the first fabric port 1202. The first PCIe switch 120 queries the thirteenth entry based on the bus identity corresponding to the second PCIe device 131 to obtain the port identity of the first fabric port 1202, and determines the first fabric port 1202 based on the port identity of the first fabric port 1202. The first access request includes the bus identity corresponding to the second PCIe device 131.

For example, referring to FIG. 6, egress 80~83→fabric port a is configured on a downstream port. The second PCIe device 131 is the NPU 4, and the bus identity corresponding to the second PCIe device 131 is 80. The first PCIe switch 120 queries the configuration based on 80 to obtain a port identity fabric port a, and determines the fabric port a identified by fabric port a. Then, the downstream port sends a first access request to the fabric port a. In this example, egress 80~83→fabric port a is the thirteenth entry configured on the first downstream port 1203.

In some embodiments, when the fabric port receives an access request, the fabric port forwards the access request to a fabric port of a PCIe switch in another PCIe domain based on a configured entry. For example, after a fabric port of the first PCIe switch 120 receives the first access request, the first PCIe switch 120 determines the second fabric port 1212 based on the first access request and a first entry configured on the first fabric port 1202.

In some embodiments, the first entry corresponds to cross-domain routing information. The first entry includes a correspondence between a domain identity of the second PCIe domain 102 and a port identity of the second fabric port 1212. The first PCIe switch 120 queries the first entry based on the domain identity of the second PCIe domain 102 to obtain the port identity of the second fabric port 1212, and determines the second fabric port 1212 based on the port identity of the second fabric port 1212.

For example, referring to FIG. 5, egress domain 2→fabric port b is configured on the downstream port a. The first PCIe switch 120 queries the configuration based on the domain identity domain 2 to obtain a port identity fabric port b. Then, the fabric port a sends the first access request to the fabric port b identified by fabric port b.

A correspondence between a domain identity and a port identity of a fabric port is written into configuration of a fabric port, so that when forwarding a cross-domain P2P access request, the fabric port can transparently transmit the access request to a fabric port of a peer domain based on the configuration.

Scenario 2: The second PCIe device 131 accesses the first PCIe device 130.

In an example, the second PCIe device 131 generates a second access request, and sends the second access request to the second PCIe switch 121. A source PCIe device of the second access request is the second PCIe device 131 in the second PCIe domain 102, and a destination PCIe device of the second access request is the first PCIe device 130. The second PCIe switch 121 performs a routing and forwarding procedure in an egress direction, and forwards the second access request to the first PCIe switch 120. After the first PCIe switch 120 receives the second access request, a task of the first PCIe switch 120 is to send the second access request to a connected PCIe device, that is, perform routing and forwarding in an ingress direction. The routing and forwarding procedure in the egress direction performed by the second PCIe switch 121 is similar to the routing and forwarding procedure in the egress direction performed by the first PCIe switch 120 in scenario 1.

In some embodiments, routing and forwarding in an ingress direction are implemented based on interaction between a fabric port and a downstream port in a PCIe switch. In an example, after being sent from the second fabric port 1212 of the second PCIe switch 121, the second access request reaches the first fabric port 1202 of the first PCIe switch 120. After the second PCIe switch 121 receives the second access request by using the first fabric port 1202, the second PCIe switch 121 determines the first downstream port 1203. The first fabric port 1202 sends the second access request to the first downstream port 1203. After the first downstream port 1203 receives the second access request, the first downstream port 1203 sends the second access request to the first PCIe device 130.

In some embodiments, in a cross-domain P2P access process, a fabric port addresses a corresponding downstream port based on configured routing information. The following uses Implementation A as an example to describe how a fabric port addresses a downstream port during addressing based on an address window, and uses Implementation B as an example to describe how a downstream port addresses a fabric port during addressing based on a bus identity.

Implementation A: After the first PCIe switch 120 receives the second access request by using the first fabric port 1202, the first PCIe switch 120 determines the first downstream port 1203 based on the second access request and a fifth entry. Then, the first fabric port 1202 sends a second access request to the determined first downstream port 1203.

The fifth entry corresponds to local domain routing information. The fifth entry includes a correspondence between an address window of the first PCIe device 130 and a port identity of the first downstream port 1203. A destination address in the second access request belongs to the address window of the first PCIe device 130. The first PCIe switch 120 performs matching on a pre-configured address window based on the destination address in the second access request, determines that the destination address in the second access request belongs to the address window of the first PCIe device 130, queries the fifth entry based on the address window of the first PCIe device 130 to obtain the port identity of the first downstream port 1203, and determines the first downstream port 1203 based on the port identity of the first downstream port 1203.

It can be learned from the foregoing procedure that, because a correspondence between an address window and a port identity of a downstream port is pre-configured on a fabric port, when the fabric port receives an access request (that is, an access request sent by a fabric port of a peer domain for a PCIe device in a local domain) in an ingress direction, the fabric port can forward the access request to a corresponding downstream port based on an address carried in the access request, and further route the access request to a corresponding PCIe device.

Implementation B: After the first PCIe switch 120 receives the second access request by using the first fabric port 1202, the first PCIe switch 120 determines the first downstream port 1203 based on the second access request and a seventh entry configured on the first fabric port 1202. Then, the first fabric port 1202 sends a second access request to the determined first downstream port 1203.

The seventh entry corresponds to local domain routing information. The seventh entry includes a correspondence between a bus identity corresponding to the first PCIe device 130 and a port identity of the first downstream port 1203. The first PCIe switch 120 determines the first downstream port 1203 based on the second access request and the seventh entry. The second access request includes a bus identity corresponding to the first PCIe device 130.

In some embodiments, a specific PCIe device in a domain to which an access request in an ingress direction is forwarded is determined based on configuration of a downstream port.

For example, when addressing is performed based on an address window, a correspondence between an address window of a PCIe device and an identity of the PCIe device is configured on a downstream port. For example, a fifteenth entry is configured on the first downstream port 1203. When receiving the second access request, the first PCIe switch 120 determines the first PCIe device 130 based on the second access request and the fifteenth entry configured on the first downstream port 1203. The fifteenth entry is address routing information. The fifteenth entry includes a correspondence between an address window of the first PCIe device 130 and an identity of the first PCIe device 130. In an example, the first PCIe switch 120 obtains a destination address from the second access request, queries the configuration of the first downstream port 1203 based on the destination address, determines that the destination address matches the address window in the fifteenth entry, and obtains the identity of the first PCIe device 130 from the fifteenth entry, to determine the first PCIe device 130. For example, referring to FIG. 5, configuration of a downstream port includes a correspondence between an address window and an AI training card. For example, the configuration of the downstream port includes ingress window w0→NPU0. If a destination address of a received access request belongs to window w0, the PCIe switch 1 forwards the access request to the NPU 0 by using the downstream port DP 0 after querying the configuration of the downstream port. In this manner, when processing the access request in the ingress direction, the downstream port can automatically address a specified PCIe device based on a pre-configured address entry and a destination address of the access request, to forward the received access request to the PCIe device.

For example, when addressing is performed based on a bus identity, a correspondence between a bus identity corresponding to a PCIe device and an identity of the PCIe device is configured on a downstream port. For example, a seventeenth entry is configured on the first downstream port 1203. When receiving the second access request, the first PCIe switch 120 determines the first PCIe device 130 based on the second access request and the seventeenth entry configured on the first downstream port 1203. The seventeenth entry is ID routing information. The seventeenth entry includes a correspondence between a bus identity corresponding to the first PCIe device 130 and an identity of the first PCIe device 130. In an example, the first PCIe switch 120 obtains a bus identity of a destination bus from the second access request, queries the configuration of the first downstream port 1203 based on the bus identity of the destination bus, determines that the bus identity of the destination bus matches the bus identity in the seventeenth entry, and obtains the identity of the first PCIe device 130 from the seventeenth entry, to determine the first PCIe device 130. For example, referring to FIG. 6, configuration of a downstream port includes a correspondence between a bus identity and an AI training card. For example, the configuration of the downstream port includes ingress 10→NPU0. If a bus identity of a destination bus of a received access request is 10, the PCIe switch 1 forwards, by using the downstream port DP 0 after querying the configuration of the downstream port, the access request to the NPU 0 connected to the bus 10. In this manner, when processing the access request in the ingress direction, the downstream port can automatically address a specified PCIe device based on a pre-configured ID entry and a bus identity of a destination bus of the access request, to forward the received access request to the PCIe device.

Routing information is configured on a PCIe port, and the PCIe switch forwards an access request by using the configured routing information, so that a P2P channel and an H2D channel are established in a multiprocessor system. The following describes a P2P channel and an H2D channel in the system architecture of the embodiments by using examples from (I) to (II).

(I) P2P Channel

A multiprocessor system includes a plurality of P2P channels. The P2P channel is a channel between different PCIe devices. The P2P channel is used to transmit an access request between different PCIe devices. A start point of the P2P channel is a PCIe device (for example, an AI training card), and an end point of the P2P channel is another PCIe device (for example, another AI training card). The P2P channel is established by using a PCIe switch. The P2P channel includes at least one of an intra-domain P2P channel or a cross-domain P2P channel.

(I-1) Intra-Domain P2P Channel

The intra-domain P2P channel is a P2P channel located in a same PCIe domain. The intra-domain P2P channel is used to transmit an access request between different PCIe devices in the same PCIe domain. A start point and an end point of the intra-domain P2P channel are respectively two PCIe devices in the same PCIe domain. The intra-domain P2P channel is established by using a PCIe switch in the domain. In the dual-CPU system shown in FIG. 4, the intra-domain P2P channel includes a first intra-domain P2P channel and a second intra-domain P2P channel.

The first intra-domain P2P channel is an intra-domain P2P channel between different PCIe devices in the first PCIe domain 101. The first intra-domain P2P channel may be represented as a PCIe device in the first PCIe domain→the first PCIe switch 120→another PCIe device in the first PCIe domain. A start point and an end point of the first intra-domain P2P channel are respectively two PCIe devices in the first PCIe domain 101. The first intra-domain P2P channel is established by using the first PCIe switch 120. When the PCIe device in the first PCIe domain sends an access request, the first PCIe switch 120 forwards the access request to the another PCIe device 130, so that the access request is transmitted to the another PCIe device in the first PCIe domain through the first intra-domain P2P channel. For example, referring to FIG. 5, a channel of the NPU 0→the PCIe switch 1→the NPU 1 is an example of the first intra-domain P2P channel.

The second intra-domain P2P channel is an intra-domain P2P channel between different PCIe devices in the second PCIe domain 102. The second intra-domain P2P channel may be represented as a PCIe device in the second PCIe domain→the second PCIe switch 121→another PCIe device 130 in the second PCIe domain. A start point and an end point of the second intra-domain P2P channel are respectively two PCIe devices in the second PCIe domain 102. The second intra-domain P2P channel is established by using the second PCIe switch 121. When the PCIe device in the second PCIe domain sends an access request, the second PCIe switch 121 forwards the access request to the another PCIe device in the second PCIe domain, so that the access request is transmitted to the another PCIe device in the second PCIe domain through the second intra-domain P2P channel. For example, referring to FIG. 5, a channel of the NPU 0→the PCIe switch 1→the NPU 1 is an example of the second intra-domain P2P channel.

(I-2) Cross-Domain P2P Channel

The cross-domain P2P channel is a P2P channel between PCIe devices in different PCIe domains. The cross-domain P2P channel is used to transmit an access request from a PCIe device in one PCIe domain to a PCIe device in another PCIe domain. A start point of the cross-domain P2P channel is the PCIe device in the PCIe domain, and another start point of the cross-domain P2P channel is the PCIe device in the another PCIe domain. For example, referring to FIG. 5, a channel of the NPU 0→the PCIe switch 1→the PCIe switch 2→the NPU 4 is an example of a cross-domain P2P channel. The cross-domain P2P channel is established by using PCIe switches in a plurality of PCIe domains. A PCIe switch forwards an access request of a PCIe device in a local domain to a PCIe switch in another PCIe domain, so that the access request can be transmitted across domains.

Referring to FIG. 4, cross-domain transmission from the first PCIe domain 101 to the second PCIe domain 102 is used as an example. A cross-domain P2P channel includes the first PCIe device 130→the first PCIe switch 120→the second PCIe switch 121→the second PCIe device 131. When the first PCIe device 130 initiates an access request to the second PCIe device 131, the first PCIe switch 120 forwards the access request to the second PCIe switch 121, so that the access request is transmitted from the first PCIe domain 101 to the second PCIe domain 102. The second PCIe switch 121 forwards the access request to the second PCIe device 131, and the second PCIe device 131 receives the access request from the second PCIe switch 121.

Referring to FIG. 4, cross-domain transmission from the second PCIe domain 102 to the first PCIe domain 101 is used as an example. A cross-domain P2P channel includes the second PCIe device 131→the second PCIe switch 121→the first PCIe switch 120→the first PCIe device 130. When the second PCIe device 131 initiates an access request to the first PCIe device 130, the second PCIe switch 121 forwards the access request to the first PCIe switch 120, so that the access request is transmitted from the second PCIe domain 102 to the first PCIe domain 101. The first PCIe switch 120 forwards the access request to the first PCIe device 130, and the first PCIe device 130 receives the access request from the first PCIe switch 120.

P2P communication performance between different PCIe devices can be significantly improved by using the plurality of P2P channels provided by the foregoing system architecture. The following describes a technical principle for implementing this technical effect.

For one thing, in the system 100 or the system 200, a cross-domain P2P channel is established by using PCIe switches in different PCIe domains, and a plurality of PCIe switches are responsible for forwarding a cross-domain P2P access request. Therefore, a high-speed transmission capability of the PCIe switch can be fully utilized during forwarding of the cross-domain P2P access request, so that a transmission delay of the cross-domain P2P access request is reduced. In addition, because transmission of the cross-domain P2P access request does not depend on forwarding of a CPU, a case in which cross-domain P2P communication performance is affected due to heavy CPU load is avoided, and reliability and stability of cross-domain P2P communication are improved. For example, FIG. 2 and FIG. 5 are compared. In the manner shown in FIG. 2, when an NPU under the PCIe switch 1 accesses an NPU under the PCIe switch 2, forwarding depends on the CPU 1 and the CPU 2. Therefore, once load of the CPU 1 or the CPU 2 is heavy, P2P communication performance between NPUs is affected. However, in the manner shown in FIG. 5, when an NPU under the PCIe switch 1 accesses an NPU under the PCIe switch 2, forwarding is responsible by the PCIe switch 1 and the PCIe switch 2 and does not depend on the CPU 1 and the CPU 2. Therefore, mutual access between NPUs under different PCIe switches is not affected due to high load of the CPU 1 or the CPU 2, so that reliability of communication performance that exists when the NPU under the PCIe switch 1 and the NPU under the PCIe switch 2 access each other is ensured.

For another thing, in the system 100 or the system 200, because a task of forwarding a cross-domain P2P access request is offloaded from a CPU to a plurality of PCIe switches, CPU load is reduced.

Especially, when the method is applied to a single-server multi-card AI training scenario, because P2P communication performance of different AI training cards in a server is ensured to be consistent in the method, P2P communication performance of the AI training cards is balanced. This helps different AI training cards quickly synchronize parameters by using a P2P channel.

(II) H2D Channel

A multiprocessor system includes a plurality of H2D channels. The H2D channel is a channel between a CPU and a PCIe device. The H2D channel is used to transmit an access request of the CPU for the PCIe device. A start point of the H2D channel is, for example, the CPU. An end point of the H2D channel is, for example, the PCIe device. The H2D channel is established by using a PCIe switch. In the dual-CPU system shown in FIG. 4, the H2D channel includes a first H2D channel and a second H2D channel.

The first H2D channel is an H2D channel between the first central processing unit 110 and the first PCIe device 130. The first H2D channel may be represented as the first central processing unit 110→the first PCIe switch 120→the first PCIe device 130. A start point of the first H2D channel is the first central processing unit 110. An end point of the first H2D channel is the first PCIe device 130. The first H2D channel is established by using the first PCIe switch 120. When the first central processing unit 110 sends an access request, the first PCIe switch 120 forwards the access request to the first PCIe device 130, so that the access request is transmitted to the first PCIe device 130 through the first H2D channel. For example, referring to FIG. 5, a channel of the CPU 1→the PCIe switch 1→the NPU 0 is an example of the first H2D channel.

The second H2D channel is an H2D channel between the second central processing unit 111 and the second PCIe device 131. The second H2D channel may be represented as the second central processing unit 111→the second PCIe switch 121→the second PCIe device 131. A start point of the second H2D channel is the second central processing unit 111. An end point of the second H2D channel is the second PCIe device 131. The second H2D channel is established by using the second PCIe switch 121. When the second central processing unit 111 sends an access request, the second PCIe switch 121 forwards the access request to the second PCIe device 131, so that the access request is transmitted to the second PCIe device 131 through the second H2D channel.

For example, referring to FIG. 5, a channel of the CPU 2→the PCIe switch 2→the NPU 4 is an example of the second H2D channel.

H2D communication performance of a plurality of CPUs can be significantly improved by using the plurality of H2D channels provided by the foregoing system architecture. The following describes a technical principle for implementing this technical effect.

In an example, in the system 100 or the system 200, H2D channels of different CPUs are established by using different PCIe switches, and access requests of different CPUs are forwarded by using different PCIe switches. Therefore, when performing H2D access, the different CPUs can use bandwidth resources and processing resources provided by the different PCIe switches, so that mutual occupation of bandwidth resources and processing resources needed by the different CPUs for the H2D access is avoided, and a balance between bandwidth resources and processing resources needed by each CPU for H2D access is ensured. In this way, H2D communication performance of a plurality of CPUs is balanced. For example, FIG. 1 and FIG. 5 is compared. In a manner shown in FIG. 5, an access request sent by the CPU 1 to an NPU passes through the PCIe switch 1, and an access request sent by the CPU 2 to an NPU also passes through the PCIe switch 1. In this case, both the CPU 2 and the CPU 1 need to occupy bandwidth resources and processing resources of the PCIe switch 1 during H2D access. As a result, resources needed by a single CPU to perform H2D access are insufficient. However, in the manner shown in FIG. 1, an access request sent by the CPU 1 to an NPU passes through the PCIe switch 1, and an access request sent by the CPU 2 to an NPU passes through the PCIe switch 2. In this case, when the CPU 2 and the CPU 1 use bandwidth resources and processing resources of different PCIe switches during H2D access, the CPU 2 and the CPU 1 do not affect each other. Therefore, H2D communication performance of accessing the PCIe device by the CPU 2 is consistent with H2D communication performance of accessing the PCIe device by the CPU 1.

In an example, in the system 100 or the system 200, different H2D channels are independent of each other, and an access request of each CPU does not need to depend on forwarding of a CPU in another PCIe domain. Therefore, a case in which another CPU cannot perform H2D access due to a single point of failure of one CPU is avoided, so that reliability of H2D communication is improved. In addition, because a task of forwarding an H2D access request is basically offloaded to a PCIe switch, load of forwarding an H2D access request by a CPU for a CPU in another PCIe domain is avoided.

For example, FIG. 1 and FIG. 5 is compared. In the manner shown in FIG. 1, because the CPU 1 is responsible for forwarding an H2D access request for the CPU 2, load of the CPU 1 is heavier. In addition, once the CPU 1 is faulty or a link between the CPU 1 and the CPU 2 is faulty, the CPU 2 may fail to perform H2D access, and reliability is inadequate. However, in the manner shown in FIG. 5, forwarding of an H2D access request of the CPU 2 is responsible by the PCIe switch 2 and does not need to pass through the CPU 1. Therefore, load balancing between the CPU 1 and the CPU 2 is ensured, and a case in which the CPU 2 cannot perform H2D access due to a single point of failure of the CPU 1 is avoided, so that reliability of H2D communication of the CPU 2 is improved.

In conclusion, in the system and method provided in embodiments, because routing information corresponding to each PCIe domain is separately configured for various ports of a PCIe switch, PCIe cross-domain address mapping is implemented, and cross-domain P2P channels between a plurality of independent PCIe topology trees can be enabled by using interconnection of PCIe switches and the configured routing information, so that performance of PCIe cross-domain P2P access is ensured to be equivalent to performance of intra-domain P2P access.

It should be noted that the foregoing listed various types of routing information are an example for describing a case in which one PCIe switch is interconnected to another PCIe switch by using one fabric port. When one PCIe switch is interconnected to PCIe switches in a plurality of PCIe domains by using a plurality of fabric ports, optionally, a system configures similar routing information for each fabric port and each downstream port in a manner similar to the foregoing listed various types of routing information. For example, in the scenario shown in FIG. 5, optionally, the PCIe switch 1 not only includes the fabric port a, but also includes a fabric port c. The fabric port c is connected to a fabric port d of a PCIe switch 3 in a PCIe domain 3 that is not shown in FIG. 5. In this case, similar to the cross-domain routing information (for example, the first entry), for example, egress domain 3→fabric port d is configured on the fabric port c. Similar to the downstream port routing information (for example, the ninth entry), for example, egress domain 3→fabric port c is configured on the downstream ports DP 0 to DP 3.

By analogy, persons skilled in the art should understand that the foregoing described routing information configuration solution can be used as a general solution for implementing cross-domain P2P access in an architecture with a plurality of CPUs and a plurality of PCIe devices. For example, when the PCIe switch 2 connected to the CPU 2, the PCIe switch 3 connected to the CPU 3, . . . , a PCIe switch i connected to a CPU i, . . . , and a PCIe switch n connected to a CPU n are interconnected to form n PCIe domains for collaborative task processing, and when corresponding routing information is configured separately for a fabric port and a downstream port of each PCIe switch of the PCIe switch 2, the PCIe switch 3, the PCIe switch i, and the PCIe switch n, a cross-domain P2P channel between any two or more PCIe domains of the PCIe domain 1, the PCIe domain 2, . . . , the PCIe domain i, . . . , and the PCIe domain n can be enabled. In this way, when computing power of a large quantity of CPUs and a large quantity of PCIe devices needs to be coordinated to perform AI training or another computing task, the method helps flexibly transmit an access request across a large quantity of PCIe domains, helps the large quantity of CPUs and the large quantity of PCIe devices perform data synchronization at a high speed, and meets a requirement for load symmetry of different CPUs and different PCIe devices.

The following describes how to apply a multiprocessor system to an AI training scenario by using an example.

In some embodiments, the multiprocessor system is applied to a single-server multi-card scenario in which AI training is performed. Multi-card means that a multiprocessor system has a plurality of AI training cards. In an example scenario, based on service planning, a first quantity of CPUs and a second quantity of AI training cards are connected by using a PCIe switch, to form a training system with symmetric load in a configuration manner provided in embodiments. Training is performed by using the training system with symmetric load. For example, referring to FIG. 5, the two CPUs and the eight NPUs are connected by using the two PCIe switches, to form a scenario of two CPUs and eight nodes.

Optionally, the multiprocessor system is applied together with a technology of binding a thread to a CPU core. In an example, a corresponding thread is allocated to each PCIe device, and a binding relationship between a thread and a CPU core is established, to meet an affinity requirement of a Non-uniform Memory Access Architecture (NUMA). When a task is performed by a multiprocessor system, a thread runs on a bound CPU core and is not scheduled to another CPU core. Load of each thread is symmetrical, so that synchronization is enabled and completed, long-time waiting is avoided, and efficiency of the multiprocessor system is maximized. During application of an AI training scenario, the thread is, for example, a training thread.

The method provided in embodiments is applied to an AI training scenario, so that an AI training card can have a high-speed P2P communication capability. In addition, AI training cards connected to different PCIe switches can quickly synchronize parameters by using cross-domain P2P channels, to accelerate performing of an AI training task. In addition, cross-domain P2P access of different PCIe devices is implemented by using a PCIe switch and does not depend on a dedicated bus for P2P communication. In this case, costs caused by adding a dedicated bus for P2P communication are avoided, and therefore implementation costs are low. In addition, a limitation problem that a PCIe device can perform cross-domain P2P access only when the PCIe device has an interface for accessing the dedicated bus for P2P communication is resolved, and various PCIe devices can be applied. Therefore, application scenarios are wide, and practicability is high. In addition, because the method ensures that different CPUs in a server have equal H2D communication performance for an AI training card, H2D communication performance of a plurality of CPUs is balanced. This helps each CPU and the AI training card more quickly perform training tasks such as data copying and message synchronization.

In some embodiments, a computer device is further provided. The computer device includes the system 100 shown in FIG. 4, the system 200 shown in FIG. 5, or the system 300 shown in FIG. 6. The computer device is, for example, a server, a host, or a personal computer.

In some embodiments, an apparatus for configuring a multiprocessor system is provided. The apparatus is configured to configure the system 100 shown in FIG. 4, the system 200 shown in FIG. 5, or the system 300 shown in FIG. 6. The apparatus for configuring a multiprocessor system includes at least one unit. In some embodiments, the unit in the apparatus for configuring a multiprocessor system is implemented by using software, and the unit in the apparatus provided in the embodiment is a program module. In some other embodiments, the unit in the apparatus for configuring a multiprocessor system is implemented by hardware or firmware. For example details of the apparatus for configuring a multiprocessor system, refer to corresponding descriptions of the system 100 shown in FIG. 4, the system 200 shown in FIG. 5, the system 300 shown in FIG. 6, the software 400 shown in FIG. 8, the method 500 shown in FIG. 5, and the like. The details are not described herein again.

In some embodiments, a computer-readable storage medium is provided. The storage medium stores at least one instruction, and the instruction is read by a processor to configure the system 100 shown in FIG. 4, the system 200 shown in FIG. 5, or the system 300 shown in FIG. 6.

In some embodiments, a computer program product is provided. The computer program product includes computer instructions, and the computer instructions are stored in a computer-readable storage medium. A processor of a multiprocessor system reads the computer instructions from the computer-readable storage medium, and the processor executes the computer instructions to configure the system 100 shown in FIG. 4, the system 200 shown in FIG. 5, or the system 300 shown in FIG. 6.

Persons of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. Persons of ordinary skill in the art may use different methods to implement the described functions for each particular application, but it should not be considered that the implementation goes beyond the scope of this application.

It may be clearly understood by persons skilled in the art that, for convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of embodiments in this application.

In addition, the units in embodiments of this application may be integrated into one processing unit, or each of the units may exist alone physically, or two or more units may be integrated into one unit. The integrated unit may be implemented in a form of hardware, or may be implemented in a form of a software unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

In this application, the terms such as "first" and "second" are used to distinguish between same or similar items whose effects and functions are basically the same. It should be understood that there is no logical or time sequence dependency between "first" and "second", and a quantity and an execution sequence are not limited. It should be further understood that although the terms such as "first" and "second" are used in the following descriptions to describe various elements, these elements should not be limited by the terms. These terms are merely used to distinguish one element from another element. For example, without departing from the scope of various examples, a first PCIe switch may be referred to as a second PCIe switch, and similarly, a second PCIe switch may be referred to as a first PCIe switch. Both the first PCIe switch and the second PCIe switch may be PCIe switches, and in some cases, may be separate and different PCIe switches.

The term "at least one" in this application means one or more, and the term "a plurality of" in this application means two or more. For example, "a plurality of PCIe devices" means two or more PCIe devices. The terms "system" and "network" may be used interchangeably in this specification.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely implementations of this application, but are not intended to limit the protection scope of this application. Any modification or replacement readily figured out by persons skilled in the art within the technical scope disclosed in this application shall fall within the protection scope of this application. Therefore, the protection scope of this application shall be subject to the protection scope of the claims.

All or a part of the foregoing embodiments may be implemented by using software, hardware, firmware, or any combination thereof. When software is used to implement embodiments, all or a part of the embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, digital video disc (DVD)), or a semiconductor medium (for example, an SSD), or the like.

Persons of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A multiprocessor system comprising:
    a first Peripheral Component Interconnect Express (PCIe) domain, wherein the first PCIe domain comprises:
        a first processor configured to perform enumeration;
        a first PCIe switch connected to the first processor, wherein the first PCIe switch further comprises a first fabric port that is configured to reject a scanning instruction of the first processor when the first processor performs the enumeration; and
        a first PCIe device connected to the first PCIe switch;
    a bus; and
    a second PCIe domain, wherein the second PCIe domain comprises:
        a second processor;
        a second PCIe switch connected to the second processor and configured to communicate with the first PCIe switch using the bus; and
        a second PCIe device connected to the second PCIe switch, wherein the first processor or the first PCIe device is configured to access the second PCIe device using the bus when the first processor performs the enumeration.

2. The multiprocessor system of claim 1, wherein the first PCIe switch further comprises firmware, and wherein the firmware is configured to configure the first fabric port to reject the scanning instruction when the first processor performs the enumeration.

3. The multiprocessor system of claim 1, further comprising a basic input/output system (BIOS), wherein the BIOS is configured to configure the first fabric port to reject the scanning instruction when the first processor performs the enumeration.

4. The multiprocessor system of claim 1, further comprising a baseboard management controller (BMC), wherein the BMC is configured to configure the first fabric port to reject the scanning instruction when the first processor performs the enumeration.

5. The multiprocessor system of claim 1, wherein the second PCIe switch further comprises a second fabric port, wherein the second fabric port is configured to communicate with the first PCIe switch, wherein the first fabric port is configured with cross-domain routing information, wherein the first processor or the first PCIe device is configured to access the second PCIe device based on the cross-domain routing information, and wherein the cross-domain routing information indicates a first correspondence between address information of the second PCIe device and a port identity of the second fabric port.

6. The multiprocessor system of claim 5, wherein the cross-domain routing information comprises:
    a second correspondence between a domain identity of the second PCIe domain and the port identity of the second fabric port; and
    a third correspondence between the address information of the second PCIe device and the domain identity of the second PCIe domain.

7. The multiprocessor system of claim 1, wherein the first PCIe switch comprises a first downstream port, wherein the first downstream port is connected to the first PCIe device, wherein the first fabric port is configured with local domain routing information, and wherein the local domain routing information comprises a correspondence between address information of the first PCIe device and a port identity of the first downstream port.

8. The multiprocessor system of claim 5, wherein the first PCIe switch comprises a first downstream port, wherein the first downstream port is configured with downstream port routing information, and wherein the downstream port routing information indicates a first correspondence between the address information of the second PCIe device and a port identity of the first fabric port.

9. The multiprocessor system of claim 8, wherein the downstream port routing information comprises:
    a relationship between a domain identity of the second PCIe domain and the port identity of the first fabric port; and
    a second correspondence between the address information of the second PCIe device and the domain identity of the second PCIe domain.

10. A method for configuring a multiprocessor system, wherein the method comprises:
    providing a first Peripheral Component Interconnect Express (PCIe) domain comprising a first processor, a first PCIe switch having a first fabric port and connected to the first processor, and a first PCIe device connected to the first PCIe switch;
    performing, by the first processor, enumeration;
    configuring the first fabric port to communicate with a second PCIe switch of a second PCIe domain;
    providing a second PCIe domain comprising a second processor, a second PCIe switch connected to the second processor, and a second PCIe device connected to the second PCIe switch;
    providing a bus;
    enabling communication between the first PCIe switch and the second PCIe switch using the bus;
    configuring the first PCIe domain and the second PCIe domain to provide the first processor or the first PCIe device access to the second PCIe device using the bus when the first processor performs the enumeration, wherein configuring the first PCIe domain and the second PCIe domain further comprises configuring the first fabric port to reject a scanning instruction of the first processor when the first processor performs the enumeration.

11. The method of claim 10, further comprising providing the first PCIe switch with firmware, wherein configuring the first fabric port using the firmware.

12. The method of claim 10, further comprising configuring the first fabric port using a basic input/output system (BIOS) or a baseboard management controller (BMC).

13. The method of claim 10, further comprising:
providing the second PCIe switch with a second fabric port; and
configuring the second fabric port to communicate with the first PCIe switch,
wherein configuring the first PCIe domain and the second PCIe domain further comprises:
  configuring cross-domain routing information for the first fabric port;
  providing the first processor or the first PCIe device access to the second PCIe device based on the cross-domain routing information, and wherein the cross-domain routing information indicates a first correspondence between address information of the second PCIe device and a port identity of the second fabric port.

14. The method of claim 13, wherein the cross-domain routing information comprises:
a second correspondence between a domain identity of the second PCIe domain and the port identity of the second fabric port, and
a third correspondence between the address information of the second PCIe device and the domain identity of the second PCIe domain.

15. The method of claim 10, further comprising providing the first PCIe switch with a first downstream port, wherein the first downstream port is connected to the first PCIe device, and wherein configuring the first PCIe domain and the second PCIe domain further comprises configuring local domain routing information for the first fabric port, wherein the local domain routing information comprises a correspondence between address information of the first PCIe device and a port identity of the first downstream port.

16. The method of claim 13, further comprising providing the first PCIe switch with a first downstream port, and wherein configuring the first PCIe domain and the second PCIe domain further comprises configuring downstream port routing information for the first downstream port, wherein the downstream port routing information indicates a correspondence between the address information of the second PCIe device and a port identity of the first fabric port.

17. A Peripheral Component Interconnect Express (PCIe) domain, comprising:
  a first processor configured to perform enumeration;
  a first PCIe switch connected to the first processor, wherein the first PCIe switch is configured to communicate with a second PCIe switch of a second PCIe domain using a bus, and wherein the first PCIe switch further comprises a first fabric port that is configured to reject a scanning instruction of the first processor when the first processor performs the enumeration; and
  a first PCIe device connected to the first PCIe switch,
  wherein the first processor or the first PCIe device is configured to access a second PCIe device of the second PCIe domain using the bus when the first processor performs the enumeration.

18. The PCIe domain of claim 17, wherein the first PCIe switch further comprises firmware, and wherein the firmware is configured to configure the first fabric port to reject the scanning instruction when the first processor performs the enumeration.

19. The PCIe domain of claim 17, further comprising a basic input/output system (BIOS), wherein the BIOS is configured to configure the first fabric port to reject the scanning instruction when the first processor performs the enumeration.

20. The PCIe domain of claim 17, further comprising a baseboard management controller (BMC), wherein the BMC is configured to configure the first fabric port to reject the scanning instruction when the first processor performs the enumeration.

* * * * *